United States Patent
Jozsa et al.

(10) Patent No.: US 12,273,154 B1
(45) Date of Patent: Apr. 8, 2025

(54) RADIO SIGNAL PREDICTION IN AN ENVIRONMENT

(71) Applicant: Nokia Solutions and Networks Oy, Espoo (FI)

(72) Inventors: Csaba Mate Jozsa, Budapest (HU); Gábor Sörös, Budapest (HU); Lóránt Farkas, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/917,819

(22) Filed: Oct. 16, 2024

(30) Foreign Application Priority Data

Oct. 17, 2023 (FI) .................................... 20236154

(51) Int. Cl.
*H04B 17/391* (2015.01)

(52) U.S. Cl.
CPC ..... *H04B 17/3913* (2015.01); *H04B 17/3912* (2015.01)

(58) Field of Classification Search
CPC ................ H04B 17/3913; H04B 17/3912
See application file for complete search history.

(56) References Cited

U.S. PATENT DOCUMENTS

| | | | |
|---|---|---|---|
| 10,834,532 B2 | 11/2020 | Fuerst et al. | |
| 11,425,635 B2 | 8/2022 | Zeng et al. | |
| 2017/0064515 A1* | 3/2017 | Heikkila | G01S 5/02522 |

FOREIGN PATENT DOCUMENTS

| | | |
|---|---|---|
| CN | 110213003 A | 9/2019 |
| CN | 113329437 A | 8/2021 |
| CN | 114205846 A | 3/2022 |
| WO | 2019/081781 A1 | 5/2019 |
| WO | 2019/109780 A1 | 6/2019 |
| WO | 2020/125349 A1 | 6/2020 |

OTHER PUBLICATIONS

Anusuya et al., "Wireless Channel Models for Indoor Environments", Defence Science Journal, vol. 58, No. 06, Nov. 2008, pp. 771-777.

Ostlin et al., "Macrocell Path-Loss Prediction Using Artificial Neural Networks", IEEE Transactions on Vehicular Technology, vol. 59, No. 06, Jul. 2010, pp. 2735-2747.

(Continued)

*Primary Examiner* — Natasha W Cosme
(74) *Attorney, Agent, or Firm* — Nokia Technologies Oy

(57) ABSTRACT

Disclosed is a method comprising: creating a first structure graph whose nodes represent points of a first structure map, the nodes being associated with state vectors obtained using feature vectors of the points of the first structure map; creating a first RF graph having nodes representing points of a respective first RF map; creating a first input graph from the first structure graph and the first RF graph; updating state vectors of the nodes of the first input graph; creating an output graph whose nodes represent target spatial points of the environment; connecting the output graph with at least the first input graph; updating the state vectors of the output graph; inputting the state vectors of the output graph to a trained machine learning model to obtain a prediction of a signal propagation characteristic at the target points.

20 Claims, 6 Drawing Sheets

(56) References Cited

OTHER PUBLICATIONS

Ayadi et al., "A UHF Path Loss Model Using Learning Machine for Heterogeneous Networks", IEEE Transactions on Antennas and Propagation, vol. 65, No. 07, Jul. 2017, pp. 3675-3683.

Liao et al., "The Rayleigh Fading Channel Prediction via Deep Learning", Wireless Communications and Mobile Computing, vol. 2018, Article 6497340, Jul. 25, 2018, pp. 1-11.

Zhang et al., "Path Loss Prediction Based on Machine Learning: Principle, Method, and Data Expansion", Applied Sciences, vol. 09, No. 09, May 9, 2019, pp. 1-18.

Koivumaki et al., "Impacts of Point Cloud Modeling on the Accuracy of Ray-Based Multipath Propagation Simulations", IEEE Transactions on Antennas and Propagation, vol. 69, No. 08, Aug. 2021, pp. 4737-4747.

Wisanmongkol et al., "An ensemble approach to deep-learning-based wireless indoor localization", IET Wireless Sensor Systems, vol. 12, No. 02, Apr. 2022, pp. 33-55.

Zhang et al., "Air-to-Air Path Loss Prediction Based on Machine Learning Methods in Urban Environments", Wireless Communications and Mobile Computing, vol. 2018, Article 8489326, Jun. 13, 2018, pp. 1-9.

Aldossari et al., "Predicting the Path Loss of Wireless Channel Models Using Machine Learning Techniques in MmWave Urban Communications", 22nd International Symposium on Wireless Personal Multimedia Communications (WPMC), Nov. 24-27, 2019, 6 pages.

Hashemifar et al., "Augmenting visual SLAM with Wi-Fi sensing for indoor applications", Autonomous Robots, vol. 43, Jul. 18, 2019, pp. 2245-2260.

Ayyalasomayajula et al., "Deep Learning based Wireless Localization for Indoor Navigation", Proceedings of the 26th Annual International Conference on Mobile Computing and Networking, Sep. 21-25, 2020, 14 pages.

Jakes et al., "Microwave Mobile Communications", Wiley-IEEE, 1994, 78 pages.

Roche et al., "2.5D extensions of the Frequency Domain ParFlow Algorithm for Simulating 802.11b/g Radio Coverage in multifloored buildings", IEEE Vehicular Technology Conference, Sep. 25-28, 2006, 5 pages.

Friis, "A Note on a Simple Transmission Formula", Proceedings of the I.R.E. and Waves and Electrons, May 1946, 254-256.

Sinkhorn et al., "Concerning Nonnegative Matrices and Doubly Stochastic Matrices", Pacific Journal of Mathematics, vol. 21, No. 02, Dec. 1967, 9 pages.

Besl et al., "A Method for Registration of 3-D Shapes", Pacific Journal of Mathematics, Proceedings vol. 1611, Sensor Fusion IV: Control Paradigms and Data Structures (ROBOTICS), 1991, pp. 586-606.

Ioffe et al., "Batch Normalization: Accelerating Deep Network Training by Reducing Internal Covariate Shift", Proceedings of the 32 nd International Conference on Machine Learning, vol. 37, Jul. 7-9, 2015, 9 pages.

Ba et al., "Layer Normalization", arXiv, Jul. 21, 2016, pp. 1-14.

Krizhevsky et al., "ImageNet Classification with Deep Convolutional Neural Networks", Advances in Neural Information Processing Systems 25 (NIPS), Dec. 3-6, 2012, pp. 1-9.

Vaswani et al., "Attention Is All You Need", arXiv, Aug. 2, 2023, pp. 1-15.

Wu et al., "Group Normalization", Proceedings of the European Conference on Computer Vision (ECCV), Sep. 8-14, 2018, pp. 1-17.

Sarlin et al., "SuperGlue: Learning Feature Matching with Graph Neural Networks", Proceedings of the IEEE/CVF Conference on Computer Vision and Pattern Recognition (CVPR), Jun. 13-19, 2020, pp. 4938-4947.

Thomas et al., "KPConv: Flexible and Deformable Convolution for Point Clouds", Proceedings of the IEEE/CVF International Conference on Computer Vision (ICCV), Oct. 27-Nov. 2, 2019, pp. 6411-6420.

Qin et al., "Geometric Transformer for Fast and Robust Point Cloud Registration", Proceedings of the IEEE/CVF Conference on Computer Vision and Pattern Recognition (CVPR), Jun. 19-24, 2022, pp. 11143-11152.

Seidel et al., "914 MHz Path Loss Prediction Models for Indoor Wireless Communications in Multifloored Buildings", IEEE Transactions on Antennas and Propagation, vol. 40, No. 02, Feb. 1992, pp. 207-217.

Cavalcanti et al., "A Hybrid Path Loss Prediction Model based on Artificial Neural Networks using Empirical Models for LTE And LTE-A at 800 MHz and 2600 MHz", Journal of Microwaves, Optoelectronics and Electromagnetic Applications, vol. 16, No. 03, Sep. 2017, pp. 708-722.

Torun et al., "Spatial Prediction of Channel Signal Strength Map Using Deep Fully Convolutional Neural Network", 56th Asilomar Conference on Signals, Systems, and Computers, Oct. 31-Nov. 2, 2022, pp. 553-558.

Office action received for corresponding Finnish Patent Application No. 20236154, dated Mar. 13, 2024, 10 pages.

Liu et al., "A Generalizable Indoor Propagation Model Based on Graph Neural Networks", IEEE Transactions on Antennas and Propagation, vol. 71, No. 07, Jul. 2023, pp. 6098-6110.

Chen et al., "A Graph Neural Network Based Radio Map Construction Method for Urban Environment", IEEE Communications Letters vol. 27, No. 05, May 2023, pp. 1327-1331.

Office action received for corresponding Finnish Patent Application No. 20236154, dated Jun. 14, 2024, 4 pages.

\* cited by examiner

RADIO SIGNAL PREDICTION IN AN ENVIRONMENT

RELATED APPLICATION

This application claims benefit of priority from Finnish Patent App. No. 20236154, filed Oct. 17, 2023, the disclosure of which is hereby incorporated in its entirety by reference herein.

TECHNICAL FIELD

Various example embodiments relate to telecommunication systems, and more particularly to radio signal prediction in an environment.

BACKGROUND

The design of wireless communication systems and the applications relying on these wireless systems may require the accurate characterization of the radio channel. For example, the wireless signal strength may decrease as the distance between transmitter and receiver antennas increases. However, the received signal strength may exhibit random fluctuations in wireless environments because of the multi-path propagation effects, the time-varying nature of the environment and the interference caused by different transmitted radio signals.

SUMMARY

Example embodiments provide an apparatus comprising: at least one processor; and at least one memory storing instructions that, when executed by the at least one processor, cause the apparatus at least to perform: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph, whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

Example embodiments provide a method comprising: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

Example embodiments provide a non-transitory computer readable medium comprising program instructions that, when executed by an apparatus, cause the apparatus to perform at least the following: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
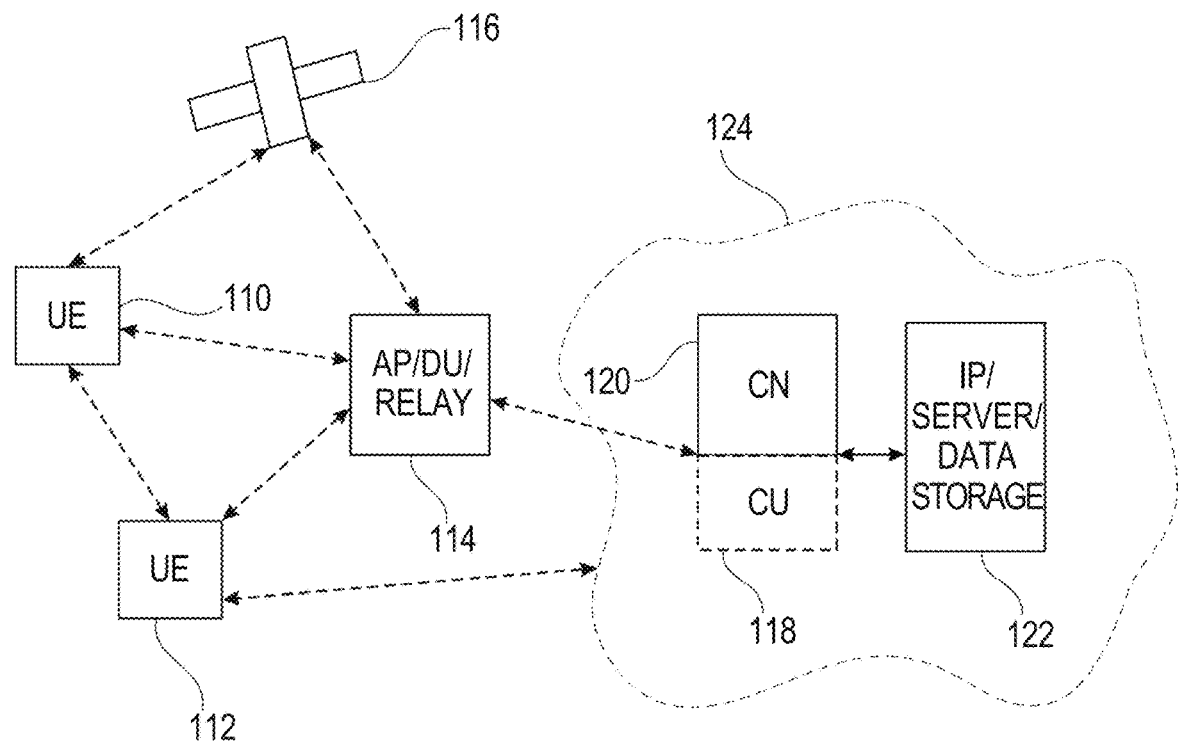
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The present subject matter may enable an accurate design of a wireless communication system in the environment. This may particularly be advantageous as the applications relying on these wireless systems may require the accurate characterization of the radio channel. For example, the predicted signal propagation characteristics at the target points may be used to design a wireless communication system in the environment. The environment may, for example, refer to an indoor environment. The environment may, for example, include a warehouse, a storehouse, or a factory. The environment may have a structure. The structure of the environment may refer to the arrangement or shape of the architecture of the environment.

The structure of the environment may be described by a digital map. The digital map may be obtained or acquired by a predefined mapping process. The digital map may be referred to as initial structure map. The initial structure map may comprise a number No of initial points ($\mathcal{P}^{S_0}$) and associated initial feature vectors ($\mathcal{F}^{S_0}$). The first structure map, for example, be obtained from the initial structure map of the environment. In one example, the first structure map may be the initial structure map. Alternatively, the first structure map may be obtained by processing the initial structure map e.g., in order to change the sampling density of the points of the initial structure map. The first structure map comprises points corresponding to occupied space. The points may thus be referred to as spatial points. The point may represent a 3D shape or object. The point may have a position as a set of coordinates (X, Y, Z) in a specific coordinate system. The first structure map may comprise a description of the points of the first structure map. The description of the point may comprise a feature vector of the point. The feature vector of the point may comprise the coordinates of the point which are given in the specific coordinate system. Alternatively, or additionally, the feature vector of the point may comprise values descriptive of features of the point. The features of the point may, for example, include at least one of: material property, surface normal, surface reflectance value, a color of an acquired image representing the point, or an embedding that was produced by an encoder.

One or more RF signal sources may be used to determine a digital RF map per RF signal source. The RF signal source may, for example, be an access point (AP), wherein the access point may be any one of: a Wi-Fi AP, WLAN AP, AP associated with a macrocell or base station, an AP associated with Hotspot, a relay node, access node, a Bluetooth beacon and another entity or device capable of wireless communication. The number of RF signal sources may be K RF signal sources, where K is an integer higher than or equal to one, K≥1. The digital RF map may be referred to as initial RF map. Thus, a number K of initial RF maps is provided. Each k-th initial RF map may be associated with a respective k-th RF signal source. E.g., if two RF signal sources are provided, two initial RF maps may be determined, wherein the first initial RF map is associated with the first RF signal source and the second initial RF map is associated with the second RF signal source. Each k-th initial RF map may comprise a number $M_0^k$ of initial points ($\mathcal{P}^{RF_0^k}$) and associated initial feature vectors ($\mathcal{F}^{RF_0^k}$), where k is an integer being one of the numbers 1 to K.

The terms "First," "Second," "k-th" or "i-th" are used as labels for nouns that they precede, and do not imply any type of ordering (e.g., spatial, temporal, logical) unless explicitly defined as such.

The at least one first RF map may, for example, be obtained from the at least one initial RF map of the environment respectively. The number of first RF maps may be equal to the number of RF signal sources, where each k-th first RF map is provided for respective k-th RF signal source. In one example, the at least one first RF map may be the at least one initial RF map respectively. Alternatively, the at least one first RF map may be obtained by processing the at least one initial RF map respectively e.g., in order to change the sampling density of the points of the initial RF map. The k-th first RF map comprises points where measurements of RF signals of the k-th RF source are performed. The k-th first RF map may comprise a description of the points of the k-th first RF map. The description of the point may comprise a feature vector and the coordinates of the point which are given in the specific coordinate system. The feature vector of the point of the k-th first RF map may comprise values descriptive of at least one of: the RF measurement performed at the point using RF signals received from the k-th RF signal source, the property of the RF signal source or the property of the sensor used to detect the RF signals. The RF measurement may, for example, be a Received Signal Strength (RSS). In one example, the feature vector of the point of the k-th first RF map may comprise an element of the unit quaternion group representing the orientation of a recording sensor while registering the RF measurement.

The present subject matter may use the graph representation in order to process the obtained maps. For that, a graph may be created for each map of the at least one first RF map using an edge connecting rule, herein referred to as first RF edge connecting rule. A graph may be created from the first structure map using an edge connecting rule, herein referred to as first structure edge connecting rule. This may result in the first structure graph which is created for the first structure map and at least one first RF graph which is created for the at least one first RF map respectively. The first structure graph may be created from the first structure map using an edge connecting rule, herein referred to as first structure edge connecting rule. The first RF graphs may be created from the respective first RF maps using the first RF edge connecting rule. The number of first RF graphs may be equal to the number of first RF maps. The first structure graph comprises nodes that represent the points of the first structure map respectively and edges which may be defined according to the first structure edge connecting rule. Each first RF graph of the one or more first RF graphs comprises nodes that represent the points of the associated first RF map respectively and edges which may be defined according to the first RF edge connecting rule. The first RF edge connecting rule may or may not be the first structure edge connecting rule.

Each node of the first structure graph may be associated with a state vector. The state vector of each node of the first structure graph may be obtained using the feature vector of the point represented by the node. For example, the state vector of the node may comprise the feature vector of the point represented by the node. Alternatively, the state vector of the node may comprise the feature vector of the point represented by the node in addition to a value indicating the coordinates of the point. For that, the state vector of the node may, for example, be obtained by concatenating the feature vector of the point represented by the node with a transformed value of the coordinates of the point, where the transformation may be the identity function or some positional encoding.

Each node of the at least one first RF graph may be associated with a state vector. The state vector of each node of the at least one first RF graph may be obtained using the feature vector of the point represented by the node. For example, the state vector of the node may comprise the feature vector of the point represented by the node. Alternatively, the state vector of the node may comprise the feature vector of the point represented by the node in addition to a value indicating the position of the point. For that, the state vector of the node may, for example, be obtained by concatenating the feature vector of the associated point with a transformed value of the coordinates of the point, where the transformation function may be the identity function or some positional encoding.

The first input graph may be defined from the first structure graph and the at least one first RF graph by using the second edge connecting rule. The first structure graph and the at least one first RF graph may be connected using the second edge connecting rule in order to obtain the first input graph. The first structure graph and the at least one first RF graph that form the first input graph may be referred to as component graphs of the first input graph. The first input graph may be created. After forming the first input graph, the present method may keep information on the component graphs that form the first input graph e.g., so that for each node of the first input graph, it may be determined whether this node belongs to the first structure graph or to any one of the at least one first RF graph. The definition of the first input graph may enable to update the state vectors of all nodes of the first structure graph and the at least one first RF graph.

The second edge connecting rule may or may not be the first RF edge connecting rule. The second edge connecting rule may or may not be the first structure edge connecting rule. The second edge connecting rule may define edges between nodes that belong to different graphs.

In one example, the edge connecting rule such as the first RF edge connecting rule, the first structure edge connecting rule, the second edge connecting rule or the output edge connecting rule may use a metric between two nodes to be connected. In case the metric meets a certain threshold for a pair of nodes, then these nodes are connected, otherwise there is no edge defined between the pair of nodes. In one example, the metric may be a distance metric between nodes which is based on the coordinates of the nodes. Alternatively, or additionally, the metric may be a state vector distance between state vectors of the nodes. Different edge connecting rules may use, for example, different metrics and/or use the same metric with different thresholds. For connecting nodes of more than one graph, the edge connecting rule such as the output edge connecting rule may use a first metric between two nodes to connect nodes that belong to the same graph and use a second metric between two nodes to connect the nodes that belong to different graphs. In one example, the first metric may be the second metric. Alternatively, the first metric may be different from the second metric.

In one example, the first structure edge connecting rule may require the connection of each node to the closest k neighbors.

In one example, the first structure edge connecting rule may require to connect every node to every other node. By connecting more nodes, the information collection and information sharing may happen in a larger spatial region and may result in better prediction accuracy.

In one example, the first RF edge connecting rule may require the connection of each node to the closest k neighbors.

In one example, the first RF edge connecting rule may require to connect every node to every other node. By connecting more nodes, the information collection and information sharing may happen in a larger spatial region and may result in better prediction accuracy.

In one example, the second edge connecting rule may require the connection of each node to the closest k neighbors.

In one example, the second edge connecting rule may require to connect every node to every other node. By connecting more nodes, the information collection and information sharing may happen in a larger spatial region and may result in better prediction accuracy.

State vectors of the nodes of the first input graph may be updated. The update of the state vector of each node of the first input graph may be performed using state vectors of intra-graph neighborhood nodes of the node and state vectors of inter-graph neighborhood nodes of the node. In one example, the inter-graph neighborhood nodes may be nodes that belong to the first input graph. In another example, the inter-graph neighborhood nodes may be nodes that belong to the first input graph and an external graph which is different from the first input graph.

If the node (structure node) of the first input graph to be updated is part of the first structure graph, the update of the state vector of the structure node may further use distances between the structure node and the intra-graph neighborhood nodes and inter-graph neighborhood nodes respectively. E.g., if the structure node has 10 intra-graph and inter-graph neighboring nodes, the 10 state vectors of the neighboring nodes as well as the 10 distances between the structure node and neighboring nodes may be used (e.g., combined) to update the state vector of the structure node. The distances may be provided as attributes of the respective edges linking the structure node and each node of the intra-graph neighborhood nodes and inter-graph neighborhood nodes. The distances may, for example, be Euclidean distances. Indeed, since the 3D position of the nodes is known, the signed relative distance between the nodes may be computed and attached to the edges connecting the nodes.

If the node (RF node) to be updated is part of the first RF graph, the update of the state vector of the RF node may further use a distance between the RF node and the access point associated with the first RF graph. The distance may, for example, be Euclidean distances.

Using the distances in the update procedure may make the update better suited for the prediction and estimation problem. The distances may play an advantageous role in RF propagation.

In one example, in order to update the state vector of each node X of the first input graph, the following may be performed. The intra-graph neighborhood nodes of the node X may be determined, wherein the intra-graph neighborhood nodes are the nodes that belong to the same component graph to which belongs the node X. In addition, inter-graph neighborhood nodes of the node X may be determined, wherein the inter-graph neighborhood nodes are the nodes that belong to the component graph(s) which are different from the component graph to which belongs the node X or that belong to the external graph. The state vectors of the determined intra-graph neighborhood nodes and inter-graph neighborhood nodes of the node X may be combined (e.g., aggregated) with the state vector of node X in order to determine a new state vector of the node X. In another example, the combined state vectors may further be combined with the distances between the node X and the intra-graph and inter-graph neighborhood nodes in order to obtain the new state. This new state vector may replace the state vector of node X, resulting in an update of the state vector of the node X.

The state vectors of the first input graph may be updated using a predefined first update technique. For example, the first update technique may be a machine learning based technique e.g., the first update technique may perform state vector combination with learnable weights.

The output graph whose nodes represent target spatial points of the environment may be created, wherein the nodes of the output graph are associated with state vectors respectively. The target spatial points may, for example, be user defined points. The state vector of each node of the output graph may be obtained from the feature vector of the target spatial point of that node. The feature vector of the target spatial point may comprise the 3D coordinates of the point and values of the features of the point. In one example, the edges of the output graph may be defined using the output edge connecting rule before or concurrently with performing the connection of the output graph with the first input graph.

The output graph may be connected or combined or fused with at least the resulting first input graph with updated state vectors in order to find the updated state vectors of the output graph. The connection of the output graph with the first input graph may be performed using the output edge connecting rule. The output edge connecting rule may or may not be the second edge connecting rule being used by the first global encoder. In one example, the output edge connecting rule may define edges between nodes of the output graph, and between nodes of the output graph and nodes of the first input graph.

In one example, the output edge connecting rule may use a metric between two nodes. In case the metric meets a certain threshold for a pair of nodes, then these nodes are connected, otherwise there is no edge defined between the nodes. In one example, the metric may be a distance metric between nodes which is based on the coordinates of the nodes and/or the feature vector distance between feature vectors of the nodes. In one example, the output edge connecting rule may require the connection of each node to the closest k neighbors. In one example, the output edge connecting rule may require to connect every node to every other node.

After the connection with the first input graph, the state vectors of the output graph may be updated using a predefined output update technique. The connection of the output graph with the first input graph may enable to update of the state vectors of the output graph using state vectors of target spatial points and state vectors from the first input graph. The output update technique may or may not be the first update technique.

The updated state vectors of the output graph may be input to a trained machine learning model in order to obtain an output of the trained machine learning model, wherein the output may be a prediction of a signal propagation characteristic at the target points of the environment.

The present subject matter may thus introduce a complete data collection pipeline for a data-driven signal characteristics prediction. The present subject matter may model the fading based on the structure of the environment and sparse RF measurements within the environment. In case the number of RF signal sources is higher than one, the present subject matter may further model interference phenomena based on the structure of the environment and sparse RF measurements within the environment. The information exchange between the environment structure and the RF measurements may create implicit propagation/fading models, while the information exchange of the RF measurements belonging to different RF signal sources may enable the implicit modeling of the interference.

The steps of receiving the first structure map and the at least one first RF map, the creation of the first structure graph and the at least one first RF graph, the creation of the first input graph and the update of the state vectors of the first input graph may be the steps of a first global encoding method. The first global encoding method may be associated with settings, wherein the settings indicate at least one of: the input maps of the first global encoding method, an example implementation of the first and second edge connecting rules being used by the first global encoding method or an example implementation of the first update technique being used by the first global encoding method. The first global encoding method may be performed by an encoder, herein referred to as first global encoder. For example, the first global encoder may execute the first global encoding using the associated settings and provides as output the first input graph with updated state vectors.

The input and output of the first global encoder may, for example, be described using the following notation. The number of RF signal sources may be K RF signal sources, where K≥1. This means that a number K of first RF maps is provided. The first structure map may comprise the points described by the set: $\mathcal{P}^{S_1}=\{x_i^{S_1} \in \mathbb{R}^3 | i=1, \ldots, N_1\}$, where $N_1$ is the number of points of the first structure map and $x_i^{S_1}$ is the position (e.g., the coordinates) of the i-th point of the first structure map in the specific coordinate system. The superscript $S_1$ represents the first structure map. The first structure map may further comprise the feature vectors described by the set:

$$\mathcal{F}^{S_1} = \left\{ f_i^{S_1} \in \mathbb{R}^{D_{S_1}} | i = 1, \ldots, N_1 \right\},$$

where $f_i^{S_1}$ is the feature vector of the i-th point of the first structure map. The feature vector $f_i^{S_1}$ has the dimension $D_{S_1}$. The first structure map may thus be defined by the pair $(\mathcal{P}^{S_1}, \mathcal{F}^{S_1})$. The k-th first RF map of the k-th RF signal source of the K RF signal sources may comprise the points described by the set:

$$\mathcal{P}^{RF_1^k} = \left\{ x_i^{RF_1^k} \in \mathbb{R}^3 | i = 1, \ldots, M_1^k \right\},$$

where Mk is the number of points of the k-th first RF map associated with the k-th RF signal source and $x_i^{RF_1^k}$ is the position (e.g., the coordinates) of the i-th point of the k-th first RF map in the specific coordinate system. The superscript $RF_1^k$ represents the k-th first RF map. The k-th first RF map may further comprise the feature vectors described by the set:

$$\mathcal{F}^{RF_1^k} = \left\{ f_i^{RF_1^k} \in \mathbb{R}^{D_{RF_1^k}} | i = 1, \ldots, M_1^k \right\},$$

where $f_i^{RF_1^k}$ is the feature vector of the i-th point of the k-th first RF map. The feature vector $f_i^{RF_1^k}$ has the dimension $D_{RF_1^k}$. The k-th first RF map may thus be defined by the pair $(\mathcal{P}^{RF_1^k}, \mathcal{F}^{RF_1^k})$. The state vector of each i-th node of the first structure graph may be referred to as $h_i^{S_1}$. The state vector of each i-th node of the k-th first RF graph may be referred to as $h_i^{RF_1^k}$.

The state vector of each i-th node of the first structure graph may be updated using (e.g., combining) the state vectors of the neighborhood nodes and optionally extended with the distances between the i-th node and the intra-graph neighborhood nodes and inter-graph neighborhood nodes respectively. The state vector $h_i^{RF_1^k}$ of each i-th node of the k-th first RF graph may be updated using (e.g., combining) state vectors of neighboring nodes and optionally extended with the distance between the i-th node of the k-th first RF graph and the k-th access point.

As described above, the first structure map and the at least one first RF map may be the initial structure map and at least one initial RF map respectively. For example, the first structure map may be defined by the pair $(\mathcal{P}^{S_1}, \mathcal{F}^{S_1})$ fulfilling the equalities: $\mathcal{P}^{S_1} = \mathcal{P}^{S_0}$ and $\mathcal{F}^{S_1} = \mathcal{F}^{S_0}$. This may mean that the points of the first structure map may be the points of the initial structure map ($N_1 = N_0$) and the points of the k-th first RF map may be the points of the respective k-th initial RF map ($M_1^k = M_0^k$). For example, the initial structure map and at least one initial RF map may be acquired using one or more sensors. Alternatively, the initial structure map and at least one initial RF map may be user defined or may be obtained from a previous execution of the present method.

Alternatively, the first structure map and the at least one first RF map may be obtained by processing the respective initial maps using a method which may be referred to as first local encoding method. The first local encoding method may comprise receiving as input the initial structure map (e.g., which is described the pair $(\mathcal{P}^{S_0}, \mathcal{F}^{S_0})$ that represents the environment and providing as output the first structure map (e.g., which is described the pair $(\mathcal{P}^{S_1}, \mathcal{F}^{S_1})$. The first local encoding method may comprise receiving as input each k-th initial RF map (e.g., which is described the pair $(\mathcal{P}^{RF_0^k}, \mathcal{F}^{RF_0^k})$) of the at least one initial RF map and providing as output the k-th first RF map (e.g., which is described by the pair $(\mathcal{P}^{RF_1^k}, \mathcal{F}^{RF_1^k})$.

The first local encoding method may comprise, upon receiving the initial structure map, determining a first set of structure feature centers representing the points of the initial structure map. The feature center may, for example, be a spatial point having coordinates in the specific coordinate system. For example, each structure feature center may be determined using a respective subset of points of the initial structure map. The first local encoding method may comprise clustering the points of the initial structure map around the first set of structure feature centers for obtaining a first set of structure clusters and performing a combination of the feature vectors descriptive of the points of the first set of structure clusters to obtain a first set of structure convolutional feature vectors representing the first set of structure feature centers respectively. For example, the combination of the feature vectors descriptive of the points of each cluster C of the first set of structure clusters may be performed in order to obtain a structure convolutional feature vector that represents the structure feature center around which the cluster C is built. The combination of the feature vectors may, for example, be performed using a machine learning model. For example, the performing of the combination of the feature vectors comprises performing a point convolution e.g., the point convolution of the first set of structure clusters may be performed to obtain a first set of structure convolutional feature vectors representing the first set of structure feature centers respectively. The output of the first local encoding method in this case may comprise the first set of structure feature centers and associated first set of structure convolutional feature vectors. The first structure map may thus be provided as the first set of structure feature centers and associated first set of structure convolutional feature vectors. Following the above notation, the number of structure feature centers may be the number $N_1$ of points in the first structure map and the number of structure convolutional feature vectors may be the number $N_1$ of points in the first structure map. For example, the set of points $\mathcal{P}^{S_1}$ may be the first set of structure feature centers and the set $\mathcal{F}^{S_1}$ may be the first set of structure convolutional feature vectors.

The first local encoding method may comprise: upon receiving the k-th initial RF map, determining a k-th first set of RF feature centers representing the points of the k-th initial RF map. For example, each RF feature center may be determined using a respective subset of points of the k-th initial RF map. The first local encoding method may comprise clustering the points of the k-th initial RF map around the k-th first set of RF feature centers for obtaining a k-th first set of RF clusters and performing a combination of the feature vectors (e.g., a point convolution) of the k-th first set of RF clusters to obtain a k-th first set of RF convolutional feature vectors representing the k-th first set of RF feature centers respectively. Thus, the output of the first local encoding method in this case may comprise a number K of first sets of RF feature centers and associated K first sets of RF convolutional feature vectors. The k-th first RF map may thus be provided as the k-th first set of RF feature centers and associated k-th first set of RF convolutional feature vectors. Following the above notation, the number of k-th set RF feature centers may be the number Mk of points of the k-th first RF map and the number of k-th set RF convolutional feature vectors may be the number MK. For example, the set $\mathcal{P}^{RF_1^k}$ may be the k-th first set of RF feature centers and the set $\mathcal{F}^{RF_1^k}$ may be the k-th first set of RF convolutional feature vectors.

The first local encoding method may be advantageous because it may reduce the initial number of points of the initial maps while providing a reliable representation of the initial maps. With this, the number of input points/measurements may be reduced keeping the pipeline computationally efficient. The first local encoder may find and encode regions, structures, surfaces that alter the RF signal propagation and handle the irregular structure of the measured data.

In one example, the first local encoding method may be executed concurrently for processing the initial structure map and the at least one initial RF map. This may speed up the execution of the present method. Alternatively, the first local encoding method may be executed sequentially for processing the initial structure map and the at least one initial RF map (e.g., by processing one map a time). This may enable a simplified implementation.

The present subject matter may provide advantageous feature center definition methods to determine the feature centers. Each feature center definition method may use respective settings for execution of the feature center definition method. In one example, a first feature center definition method may enable grid-based feature centers. The first feature center definition method may receive as input a map of points (e.g., the initial structure map) and provides as output the feature centers that represent the points of the input map (e.g., the output may be the first set of structure feature centers for the input being the initial structure map).

For example, for obtaining the first set of structure feature centers, the first local encoding method may use the first feature center definition method. The first feature center definition method may comprise: creating a grid of voxels for the environment. The grid of voxels may be created using a first granularity e.g., a 3D grid may be created for the environment with a predefined first grid voxel size. The first set of structure feature centers may be computed based on the partitioned voxel data for every voxel with available measurement points. For that, the first feature center definition method may comprise: combining the points of the initial structure map that belong to each voxel of the grid to obtain the structure feature center that represents each voxel. In particular, the points of the initial structure map may be partitioned by their coordinates into the voxels of the created grid. In case a voxel does not comprise points of the initial map, the voxel may be skipped or ignored for determination of the structure feature centers. The combination of the points of each voxel may be performed using different techniques. For example, the structure feature center for every voxel may be calculated as the arithmetic mean of the coordinates of the points belonging to the voxel. Alternatively, a model may regress the position of the structure feature center based on the voxel data. In another example, the first set of structure feature centers may be defined as the center points of the voxels respectively. The settings of the first feature center definition method may, for example, comprise at least one of the voxel size or the type of combination of the points to provide the feature center from the voxel points.

For obtaining the feature centers of the at least one first RF map, the first feature center definition method may be used. However, the settings of the first feature center definition method may or may not be the same settings that have been used for determining the first set of structure feature centers. For example, for obtaining each k-th first set of RF feature centers, the first local encoding method may use the first feature center definition method. The first feature center definition method may comprise creating a grid of voxels for the environment for the k-th first RF map. The grid of voxels may be created using a second granularity e.g., a 3D grid may be created for the environment with a predefined second grid voxel size. The first feature center definition method may comprise combining the points of the k-th initial RF map that belong to each voxel of the grid to obtain the respective RF feature center. In particular, the points of the initial structure map may be partitioned by their coordinates into the voxels of the created grid. In case a voxel does not comprise points of the initial map, the voxel may be skipped or ignored for determination of the RF feature centers. For example, the RF feature center for every voxel may be calculated as the arithmetic mean of the coordinates of the points belonging to the voxel. Alternatively, a model may regress the position of the RF feature center based on the voxel data. In another example, the k-th first set of RF feature centers may be defined as the center points of the voxels respectively.

In another example, a second feature center definition method may be provided. The second feature center definition method may receive as input a map of points (e.g., the initial structure map) and provide as output the feature centers that represent the points of the input map (e.g., the output may be the first set of structure feature centers for the input being the initial structure map). The second feature center definition method may estimate the feature centers from points of the input map by computing or estimating local gradients based on a user-defined neighborhood and selecting those points where these gradients are below or above a certain threshold, wherein the selected points may be provided as the feature centers respectively. The gradient-based algorithms may be efficient because of the required low computational power. The settings of the second feature center definition method may, for example, comprise the definition of the neighborhood and the value of the threshold. The first local encoding method may use the second feature center definition method for obtaining the first set of structure feature centers. The first local encoding method may use the second feature center definition method for obtaining each k-th first set of RF feature centers. However, the settings of the second feature center definition method may or may not be the same settings that have been used for determining the first set of structure feature centers.

In another example, a third feature center definition method may be provided. The third feature center definition method may receive as input a map of points (e.g., the initial structure map) and provides as output the feature centers that represent the points of the input map (e.g., the output may be the first set of structure feature centers for the input being the initial structure map). The third feature center definition method may determine the feature centers from the points of the input map by using a data-driven object detector (e.g., which may be a machine learning (ML) based detector) to find objects of interest in the initial points of the map, wherein the found objects are the feature centers. The settings of the third feature center definition method may, for example, comprise the type of detector to be used. The first local encoding method may use the third feature center definition method for obtaining the first set of structure feature centers. The first local encoding method may use the third feature center definition method for obtaining each k-th first set of RF feature centers. However, the settings of the third feature center definition method may or may not be the same settings that have been used for determining the first set of structure feature centers.

The present subject matter may provide advantageous clustering methods to cluster the points around the feature centers. It might happen that based on the clustering or neighborhood criteria, not every initial point can be assigned to a feature center. In this case, these points may not be used in subsequent steps of the first local encoding method.

In one example, for clustering the initial points of the initial structure map around the first set of structure feature centers, the first local encoding method may use a first clustering method. The first clustering method may receive as input a map of points (e.g., the initial structure map) and the feature centers which represent the points of the input map and provide as output a set of clusters of the points of the input map (e.g., the output may be the first set of structure clusters if the input includes the initial structure map and the first set of structure feature centers). The first clustering method may assign each initial point to one of the feature centers using a radius-based neighborhood criterion. For that, a 3D sphere with a predefined radius may be defined around each feature center according to the radius-based neighborhood criterion. Points that lie inside the sphere may be assigned to the corresponding feature center. In this case, one point might be assigned to multiple feature centers. In one example, the radius-based neighborhood criterion may further require to assign the data point only to the closest feature center. The settings of the first clustering method may, for example, comprise at least one of: the radius of the sphere or whether to assign one point to more than one feature center. Also, the clustering of the points of the k-th initial RF map around the k-th first set of RF feature centers may be performed using the first clustering method. However, the settings of the first clustering method may or may not be the same settings that have been used for determining the first set of structure clusters.

In one example, for clustering the initial points of the initial structure map around the first set of structure feature centers, the first local encoding method may use a second clustering method. The second clustering method may receive as input a map of points (e.g., the initial structure map) and the feature centers which represent the points of the input map and provide as output a set of clusters of the points of the input map (e.g., the output may be the first set of structure clusters if the input includes the initial structure map and the first set of structure feature centers). The second clustering method may assign each initial point to the closest feature center without any predefined radius. With this approach, for every initial point a feature center may be assigned. For improving the computational efficiency, the second clustering method may require the assignment of only a maximum number of nearest data points to a feature center. The settings of the second clustering method may, for example, comprise a maximum number of points to be assigned to each feature center. Also, the clustering of the points of the k-th initial RF map around the k-th first set of RF feature centers may be performed using the second clustering method. However, the settings of the second clustering method may or may not be the same settings that have been used for determining the first set of structure clusters.

The present subject matter may provide advantageous convolution methods to estimate the convolutional feature vector. The convolution method may receive as input a cluster of points, where each point is defined by its position and feature vector, and output a feature vector which is named convolutional feature vector. As described above, an example convolution method may be the point convolution but it is not limited to. The convolution method may create representations that encode the structure of the environment and the measured RF signals in a hierarchical and transformation-invariant way. The point convolution may, for example, be the Kernel Point Convolution (KPConv) approach. The settings of the point convolution may include at least one of: the number of nearest neighbors of the center point or the type of kernel function used in the convolution. The settings may further include support points of the output point, where the output point may be the feature center point and the support points may be the neighboring points of the feature center, determined by the clustering algorithm. The input features are the feature vectors of the cluster points. The output dimension may be defined by the learnable weights of the constitutional operator. The output feature vector may be assigned to the feature center.

The first local encoding method may, for example, be associated with global settings and individual settings. The global settings may indicate at least one of: the input maps of the first local encoding method, which clustering method is used by the first local encoding method, which convolution method is used by the first local encoding method or which feature center definition method is used by the first local encoding method. The individual settings may, for example, be the settings of a method used by the first local encoding method. The individual settings may be at least one of: settings of the convolution method, the setting of the feature center definition method or the settings of the clustering method being used by the first local encoding method.

The first local encoding method may be performed by an encoder, herein referred to as first local encoder. For example, the first local encoder may execute the first local encoding method using the associated global and individual settings.

Hence, as described above, the prediction of the signal propagation characteristic at the target points by the trained machine learning model may use at least the first input graph which is produced by the first global encoder. Optionally, the input maps used by the first global encoder to produce the first input graph may be provided by the first local encoder. In one example, the trained machine learning model may be a decoder having decoder learnable parameters. The first local encoder may be a trained machine learning model having first local encoder learnable parameters. The first global encoder may be a trained machine learning model having first global encoder learnable parameters. In one example, the first global encoder and the decoder may be jointly trained to determine the decoder learnable parameters and the first global encoder learnable parameters such that a deviation between the predicted signal propagation characteristics and known signal propagation characteristics is optimized. In another example, the first local encoder, the first global encoder and the decoder may be jointly trained to determine the decoder learnable parameters, the first global encoder learnable parameters and the first local encoder learnable parameters such that a deviation between the predicted signal propagation characteristics and known signal propagation characteristics is minimized.

The first global encoder and optionally the first local encoder may provide a layer (l) of encoders that provide the input for the trained machine learning model (e.g., decoder) for enabling the prediction of the signal propagation characteristic at the target points by the trained machine learning model. The present subject matter may use a further layer (similar to the first layer) to provide a multilayer architecture for enabling an improved prediction of the signal propagation characteristic at the target points by the trained machine learning model. For example, each local encoder and associated global encoder may be concatenated into a respective layer of the multilayer architecture e.g., the first local encoder and the first global encoder may be concatenated into the first layer of the multilayer architecture, the second local encoder and the second global encoder may be concatenated into the second layer of the multilayer architecture and so forth.

In one example, a second global encoder may be provided. The second global encoder may be configured to receive as input a second structure map and at least one second RF map associated with the at least one RF signal source respectively. The second global encoder may output a second input graph, wherein the decoder may connect the output graph not only with the first input graph but also with the second input graph using the output edge connecting rule. The second global encoder may perform the steps of receiving the second structure map and the at least one second RF map, the creation of a second structure graph and at least one second RF graph, the creation of the second input graph from the second structure graph and at least one second RF graph and the update of the state vectors of the second input graph. The second global encoder may receive as input at least the second structure map and the at least one second RF map and provide as output the second input graph with updated state vectors. The second structure map and the at least one second RF map may, for example, be produced by a second local encoder as described herein. The second structure graph may be created using a second structure edge connecting rule. The second structure edge connecting rule may be different from the first structure edge connecting rule. The second RF graph may be created using a second RF edge connecting rule. The second RF edge connecting rule may be different from the first RF edge connecting rule. The second input graph may be created using the second edge connecting rule. Any further structure graph of another level may be created using a respective structure edge connecting rule. Any further RF graph of another level may be created using a respective RF edge connecting rule.

The input and output of the second global encoder may, for example, be described using the following notation. The number of RF signal sources may be K RF signal sources, where K≥1. This means that a number K of second RF maps is provided. The second structure map may comprise the points described by the set:

$$\mathcal{P}^{S_2} = \left\{ x_i^{S_2} \in \mathbb{R}^3 | i = 1, \ldots, N_2 \right\},$$

where $N_2$ is the number of points of the second structure map and $x_i^{S_2}$ is the position (e.g., the coordinates) of the i-th point of the second structure map in the specific coordinate system. The superscript $S_2$ represents the second structure map. The second structure map may further comprise the feature vectors described by the set:

$$\mathcal{F}^{S_2} = \left\{ f_i^{S_2} \in \mathbb{R}^{D_{S_2}} | i = 1, \ldots, N_2 \right\},$$

where $f_i^{S_2}$ is the feature vector of the i-th point of the second structure map. The feature vector $f_i^{S_2}$ has the dimension $D_{S_2}$. The second structure map may thus be defined by the pair ($\mathcal{P}^{S_2}, \mathcal{F}^{S_2}$). The k-th second RF map of the k-th RF signal source of the K RF signal sources may comprise the points described by the set:

$$\mathcal{P}^{RF_2^k} = \left\{ x_i^{RF_2^k} \in \mathbb{R}^3 | i = 1, \ldots, M_2^k \right\},$$

where $M_2^k$ is the number of points of the second RF map associated with the k-th RF signal source and $x_i^{RF_2^k}$ is the position (e.g., the coordinates) of the i-th point of the k-th second RF map in the specific coordinate system. The superscript $RF_2^k$ represents the k-th second RF map. The k-th second RF map may further comprise the feature vectors described by the set:

$$\mathcal{F}^{RF_2^k} = \left\{ f_i^{RF_2^k} \in \mathbb{R}^{D_{RF_2^k}} | i = 1, \ldots, M_2^k \right\},$$

where $f_i^{RF_2^k}$ is the feature vector of the i-th point of the k-th second RF map. The feature vector $f_i^{RF_2^k}$ has the dimension $D_{RF_2^k}$. The k-th second RF map may thus be defined by the pair ($\mathcal{P}^{RF_2^k}, \mathcal{F}^{RF_2^k}$). The state vector of each i-th node of the second structure graph may be referred to as $h_i^{S_2}$. The state vector of each i-th node of the k-th second RF graph may be referred to as $h_i^{RF_2^k}$.

In one example, the second global encoder may be obtained from the first global encoder by changing at least part of the settings of the first global encoder. For example, the second global encoder may use the same update technique and the same edge connecting rule used by the first global encoder but use different input maps.

The second structure map and the at least one second RF map may be obtained by processing the respective first structure map and the at least one first RF map using a method which may be referred to as second local encoding method, wherein the first structure map and the at least one first RF map are obtained by the first local encoding method after processing the initial structure and RF maps. The second local encoding method may, for example, be executed by a second local encoder. The second local encoding method may receive as input the first structure map (e.g., which is described by the pair ($\mathcal{P}^{S_1}, \mathcal{F}^{S_1}$)) that represents the environment and provides as output the second structure map (e.g., which is described the pair ($\mathcal{P}^{S_2}, \mathcal{F}^{S_2}$)). The second local encoding method may receive as input each k-th first RF map (e.g., which is described by the pair ($\mathcal{P}^{RF_1^k}, \mathcal{F}^{RF_1^k}$)) of the at least one first RF map and provides as output the k-th second RF map (e.g., which is described by the pair ($\mathcal{P}^{RF_2^k}$, $\mathcal{F}^{RF_2^k}$))).

The second local encoding method may comprise, upon receiving the first structure map, e.g., which is obtained by the first local encoder, determining a second set of structure feature centers representing the points of the first structure map. The feature center may, for example, be a spatial point having coordinates in the specific coordinate system. For example, each structure feature center may be determined using a respective subset of points of the first structure map. The second local encoding method may comprise clustering the points of the first structure map around the second set of structure feature centers for obtaining a second set of structure clusters and performing a point convolution of the second set of structure clusters to obtain a second set of structure convolutional feature vectors representing the second set of structure feature centers respectively. Thus, the output of the second local encoding method in this case may comprise the second set of structure feature centers and associated second set of structure convolutional feature vectors. The second structure map may thus be provided as the second set of structure feature centers and associated second set of structure convolutional feature vectors. The number of structure feature centers may be $N_2$ and the number of structure convolutional feature vectors may be $N_2$. For example, the set $\mathcal{P}^{S_2}$ may be the second set of structure feature centers and the set $\mathcal{F}^{S_2}$ may be the second set of structure convolutional feature vectors.

The second local encoding method may comprise, upon receiving the k-th first RF map, determining a k-th second set of RF feature centers representing the points of the k-th first RF map. For example, each RF feature center may be determined using a respective subset of points of the k-th first RF map. The second local encoding method may comprise clustering the points of the k-th first RF map around the k-th second set of RF feature centers for obtaining a k-th second set of RF clusters and performing a point convolution of the k-th second set of RF clusters to obtain a k-th second set of RF convolutional feature vectors representing the k-th second set of RF feature centers respectively. Thus, the output of the second local encoding method in this case may comprise a number K of second sets of RF feature centers and associated K second sets of RF convolutional feature vectors. The k-th second RF map may thus be provided as the k-th second set of RF feature centers and associated k-th second set of RF convolutional feature vectors. The number of k-th set RF feature centers may be $M_2^k$ and the number of k-th set RF convolutional feature vectors may be $M_2^k$. For example, the set $\mathcal{P}^{RF_2^k}$ may be the k-th second set of RF feature centers and the set $\mathcal{F}^{RF_2^k}$ may be the k-th second set of RF convolutional feature vectors.

In one example, the second local encoding method may be executed concurrently for processing the first structure map and the at least one first RF map. This may speed up the execution of the present method. Alternatively, the second local encoding method may be executed sequentially for processing the first structure map and the at least one first RF map (e.g., by processing one map a time). This may enable a simplified implementation.

In one example, the second local encoder may be obtained from the first local encoder by changing at least part of the global settings and individual settings of the first local encoder. For example, the second local encoder may use the same global settings as the first local encoder but different individual settings e.g., the second local encoder may use the same clustering method used in the first local encoder but with different settings and/or use the same feature center definition method used in the first local encoder but with different settings.

In one example, the second local encoding method may use any one of the first feature center definition method, the second feature center definition method and the third feature center definition method in order to determine the second set of structure feature centers and each k-th second set of RF feature centers.

In one example, the second local encoding method may use any one of the first feature center definition method, the second feature center definition method and the third feature center definition method that is different from the feature center definition method used by the first local encoding method, in order to determine the second set of structure feature centers and each k-th second set of RF feature centers. For example, the second local encoding method may use the first feature center definition method and the first local encoding method may use the second feature center definition method.

In one example, the second local encoding method may use the same feature center definition method as the feature center definition method that is used by the first local encoding method but their individual settings are different. For example, the second local encoding method and the first local encoding method may use the first feature center definition method but with different voxel sizes.

In one example, the second local encoding method may use any one of the first clustering method and the second clustering method to perform the clustering.

The present subject matter may make use of the multi-layer architecture not only for providing the first and second input graphs to the decoder, but also for improving the creation of the first input graph based on inter-layer relations by using the component graphs of the second input graph as external graphs for performing state updates of the first input graph. In one example, the inter-graph neighboring nodes which are used to update the state vectors of the first input graph may include nodes of the second structure graph and the at least one second RF graph of the second global encoder. For example, the first input graph may comprise as initial components the first structure graph and the at least one first RF graph. The second structure graph and the at least one second RF graph may be used as external component graphs of the first input graph. The state vectors of the first input graph which are updated are the state vectors of the initial component graphs. And, for updating the state vector of each node X of the initial component graphs, the inter-graph neighborhood nodes of the node X may be determined, wherein the inter-graph neighborhood nodes are the nodes that belong to the initial component graph(s) and external component graphs which are different from the component graph to which belongs the node X.

The present subject matter may provide advantageous update techniques e.g., for updating the states vectors by the global encoder and by the decoder.

The first update technique may be performed using a graph neural network (GNN). The first global learnable parameters may be the learnable parameters of the GNN. The GNN may propagate node state vectors by exchanging information between adjacent nodes. The GNN architecture may have several propagation layers, where each node may be updated based on the aggregation of its neighbors' state vectors. The aggregation may, for example, be performed using a convolutional approach which performs a linear combination of neighbor state vectors where weights may depend only on the structure of the graph. In another example, the aggregation may be performed using an attentional approach which performs a linear combination, where weights are computed based on the state vectors. In another example, the aggregation may be performed using a message passing approach that is a general nonlinear function dependent on the state vectors of two nodes sharing an edge.

Hence, the first and second global encoders together with the first and second local encoders may provide a two-layer architecture that provide the input for the trained machine learning model (e.g., decoder) for enabling the prediction of the signal propagation characteristic at the target points by the trained machine learning model. The present subject matter may not be limited to two layers and may provide a higher number L (L>2) of layers. Each layer (l>2) may comprise a global encoder and a local encoder. The local encoder of the layer l may be the local encoder of the first layer l=1 with the same global settings but using individual settings which are different from individual settings used in local encoder of the other layers. The global encoder of the layer l may be the first global encoder of the first layer l=1, but using settings different from settings used in global encoders of the other layers. The graphs involved in each layer of the multilayer architecture may be referred to as follows. The structure graph in each layer l may be referred to as $S_l$ and the k-th RF graph in the layer l may be referred to as $RF_l^k$. The i-th node of the structure graph S of the layer l may be referred to as $v_i^{S_l}$ and the i-th node of the k-th RF graph $RF_l^k$ of the layer l may be referred to as $v_i^{RF_l^k}$.

The present subject matter may make use of the multi-layer architecture not only for providing multiple input graphs to the decoder, but also for improving the creation of the input graphs themselves based on inter-layer relations. For that, the multi-layer architecture may be used in a hierarchical manner. The layers may be provided in accordance with a predefined sequence so that one global encoder may use the graphs obtained by another global encoder of a lower level of the sequence. For example, in the two-layer architecture, the first global encoder may use the graphs obtained by the second global encoder as external graphs.

The update technique that is used by the global encoders for updating the state vectors of their respective graphs may comprise a three-step process: (i.) the state vectors of the intra-graph and inter-graph neighboring nodes are collected and transformed by functions with learnable parameters, (ii.) the transformed state vectors are aggregated, (iii.) the aggregated state vectors are combined with the original state vector through learnable functions. For example, the update technique may update the state vector of each node $v_i^{S_l}$ of the structure graph $S_l$ by determining the neighborhood nodes of the node $v_i^{S_l}$. The neighborhood nodes of the node $v_i^{S_l}$ may be the following sets of neighborhood nodes:

$$N_{v_i}^{S_l \to S_l} = \left\{ v_j^{S_l} \middle| \left(v_i^{S_l}, v_j^{S_l}\right) \in \mathcal{E}^{S_l \to S_l} \right\}, N_{v_i}^{S_l \to RF_l^k} = \left\{ v_j^{RF_l^k} \middle| \left(v_i^{S_l}, v_j^{RF_l^k}\right) \in \mathcal{E}^{S_l \to RF_l^k} \right\},$$

$$N_{v_i}^{S_l \to S_{l+1}} = \left\{ v_j^{S_{l+1}} \middle| \left(v_i^{S_l}, v_j^{S_{l+1}}\right) \in \mathcal{E}^{S_l \to S_{l+1}} \right\} \text{ and } N_{v_i}^{S_l \to RF_{l+1}^k} =$$

$$\left\{ v_j^{RF_{l+1}^k} \middle| \left(v_i^{S_l}, v_j^{RF_{l+1}^k}\right) \in \mathcal{E}^{S_l \to RF_{l+1}^k} \right\}.$$

The set $N_{v_i}^{S_l \to S_l}$ may refer to the intra-graph neighborhood nodes of the node vat, while the inter-graph neighborhood nodes of the node $v_i^{S_l}$ may comprise of $N_{v_i}^{S_l \to RF_l^k}$. Alternatively, the neighborhood nodes of the node vat may further comprise the sets of (external) nodes: $N_{v_i}^{S_l \to RF_{l+1}^k}$ and $N_{v_i}^{S_l \to S_{l+1}}$. Using the determined neighborhood nodes, the update of the state $h_i^{S_l}$ of the node $v_i^{S_l}$ may be performed as follows:

$$h_i^{S_l} = W_V^{S_l \to S_l} h_i^{S_l} + \underbrace{\sum_{v_j^{S_l} \in N_{v_i}^{S_l \to S_l}} \alpha_{ij}^{S_l \to S_l} W_V^{S_l \to S_l} h_j^{S_l}}_{\text{structure-structure}} +$$

$$\underbrace{\sum_{k=1}^{K} \sum_{RF_l^k \in N_{v_i}^{S_l \to RF_l^k}} \alpha_{ij}^{S_l \to RF_l^k} W_V^{S_l \to RF_l^k} h_j^{RF_l^k}}_{\text{structure-RF}} +$$

$$\underbrace{\sum_{k=1}^{K} \sum_{RF_l^k \in N_{v_i}^{S_l \to RF_{l+1}^k}} \alpha_{ij}^{S_l \to RF_{l+1}^k} W_V^{S_l \to RF_{l+1}^k} h_j^{RF_{l+1}^k}}_{\text{layer-wise struture-RF}} +$$

$$\underbrace{\sum_{v_j^{S_{l+1}} \in N_{v_i}^{S_l \to S_{l+1}}} \alpha_{ij}^{S_l \to S_{l+1}} W_V^{S_l \to S_{l+1}} h_j^{S_{l+1}}}_{\text{layer-wise structure-structure}},$$

where $\alpha_{ij}^{S_l \to S_l}, \alpha_{ij}^{S_l \to RF_l^k}, \alpha_{ij}^{S_l \to RF_{l+1}^k}$ and $a_{ij}^{S_l \to S_{l+1}}$ are attention weights and $$W_V^{S_l \to S_l}, W_V^{S_l \to RF_l^k}, W_V^{S_l \to RF_{l+1}^k}, W_V^{S_l \to S_{l+1}} \in \mathbb{R}^{D_{out} \times D_{in}}$$

are the value matrices with learnable weight parameters for this specific iteration. ($D_{in}$ might be different for the different types of nodes). The update technique may update each node $$v_i^{RK_l^k}$$

of the RF graph $RF_l^k$ by determining the neighborhood nodes of the node $$v_i^{RK_l^k}.$$

The neighborhood nodes of the node $$v_i^{RF_l^k}$$

may be the following sets of neighborhood nodes:

$$N_{v_i}^{RF_l^k \to RF_l^k} = \left\{ v_j^{RF_l^k} \middle| \left(v_i^{RF_l^k}, v_j^{RF_l^k}\right) \in \mathcal{E}^{RF_l^k \to RF_l^k} \right\},$$

$$N_{v_i}^{RF_l^k \to RF_l^j} = \left\{ v_i^{RF_l^j} \middle| \left(v_i^{RF_l^j}, v_j^{RF_l^k}\right) \in \mathcal{E}^{RF_l^j \to RF_l^k} \right\},$$

$$N_{v_i}^{RF_l^k \to S_l} = \left\{ v_j^{S_l} \middle| \left(v_i^{RF_l^k}, v_j^{S_l}\right) \in \mathcal{E}^{RF_l^k \to S_l} \right\},$$

-continued $$N_{v_i}^{RF_l^k \to RF_{l+1}^k} = \left\{ v_j^{RF_{l+1}^k} \Big| \left( v_i^{RF_l^k}, v_j^{RF_{l+1}^k} \right) \in \varepsilon^{RF_l^k \to RF_{l+1}^k} \right\},$$

$$N_{v_i}^{RF_l^k \to S_{l+1}} = \left\{ v_j^{S_{l+1}} \Big| \left( v_i^{RF_l^k}, v_j^{S_{l+1}} \right) \in \varepsilon^{RF_l^k \to S_{l+1}} \right\}.$$

The set $$N_{v_i}^{RF_l^k \to RF_l^k}$$

may refer to the intra-graph neighborhood nodes of the node $$v_i^{RF_l^k},$$

while the inter-graph neighborhood nodes of the node $$v_i^{RF_l^k}$$

may comprise the two sets:

$$N_{v_i}^{RF_l^j \to RF_l^k} \text{ and } N_{v_i}^{RF_l^k \to S_l}.$$

Alternatively, the neighborhood nodes of the node $$v_i^{RF_l^k}$$

may further comprise the sets of (external) nodes $$N_{v_i}^{RF_l^j \to RF_{l+1}^k} \text{ and } N_{v_i}^{RF_l^k \to S_{l+1}}.$$

Using the determined neighborhood nodes, the update of the of the node state $$h_i^{RF_l^k}$$

of the node $$v_i^{RF_l^k}$$

may be performed using the following update equation:

$$h_i^{RF_l^k} = W_V^{RF_l^k \to RF_l^k} + \underbrace{\sum_{n=1}^{K} \sum_{\in N_{v_i}^{RF_l^k \to RF_l^n}} \alpha_{ij}^{RF_l^k \to RF_l^n} W_V^{RF_l^k \to RF_l^n} h_j^{RF_l^n}}_{RF-RF} +$$

$$\underbrace{\sum_{n=1}^{K} \sum_{v_{j+1}^{RF_{l+1}^n} \in N_{v_i}^{RF_l^k \to RF_{l+1}^n}} \alpha_{ij}^{RF_l^k \to RF_{l+1}^n} W_V^{RF_l^k \to RF_{l+1}^n} h_j^{RF_{l+1}^n}}_{\text{layer-wise } RF-RF} +$$

$$\underbrace{\sum_{v_j^{S_l} \in N_{v_i}^{RF_l^k \to S_l}} \alpha_{ij}^{RF_l^k \to S_l} W_V^{RF_l^k \to S_l} h_j^{S_l}}_{RF-\text{structure}} ++$$

$$\underbrace{\sum_{v_{j+1}^{S_{l+1}} \in N_{v_i}^{RF_l^k \to S_{l+1}}} \alpha_{ij}^{RF_l^k \to S_{l+1}} W_V^{RF_l^k \to S_{l+1}} h_j^{S_{l+1}}}_{\text{layer-wise } RF-\text{structure}},$$

where $\alpha_{ij}^{RF_l^k \to S_l}$, $\alpha_{ij}^{RF_l^k \to RF_{l+1}^k}$, $\alpha_{ij}^{RF_l^k \to S_{l+1}}$ and $\alpha_{ij}^{RF_l^k \to RF_l^n}$ are attention weights and $$W_V^{RF_l^k \to S_l}, W_V^{RF_l^k \to RF_{l+1}^k}, W_V^{RF_l^k \to S_{l+1}} \text{ and } W_V^{RF_l^k \to RF_l^n} \in \mathbb{R}^{D_{out} \times D_{in}}$$

are the value matrices with learnable weight parameters for this specific iteration. ($D_{in}$ might be different for the different types of nodes).

The update of the state vector of a given node may be performed in several iterations. In every iteration new weight matrices might be defined Each added term of the update equation may be performed by a respective component. For example, the different added terms of the update equation might be performed in parallel or sequentially. In one example, the state is updated by the structural component first, after that follows the RF component and so on. In another example, the state vector is updated simultaneously by every component. The nodes of the external graphs might also be updated in a similar way.

In one example, the predicted signal propagation characteristic may, for example, be an RSS value and/or PL value at each target point. In one example, the trained machine learning model that predicts the signal propagation characteristic may comprise three different multi-layer feed-forward networks, called output heads, to produce the required output. This may enable to predict the RSS/PL values, predict the probability distribution over all empirical models and predict the parameters of the empirical models. The predicted empirical models and their predicted parameters may be used to predict the RSS/PL values at the target points.

The initial structure map may be obtained by a mapping process, wherein the mapping process may, for example, use techniques such as simultaneous localization and mapping (SLAM), LIDAR and depth sensors. The initial structure map may be represented in different forms, such as point cloud, mesh or grid-based representation. The initial structure map may be a 3D structure of the environment. The 3D structure of the environment may be represented by a point cloud. Here, as an example, generation of a point cloud from camera images is explained. Each camera image is associated with a location of the camera at the time of image taking. Typically, by visual-inertial odometry, the relative transformation between adjacent camera frames may be obtained, serving as good initial values for the SLAM state estimation. The output of the SLAM algorithm will further refine the initial relative transformation of the frames and will provide depth estimates for a subset of the image pixels. Based on the estimated depth information and the relative transformation a 3D point cloud is built representing the structure of the environment. When the tracking is lost between frames and/or because of drift error correction, re-localization may be used.

The encoding of the initial RF map (e.g., RF measurements registered at 3D locations) may happen in an equivalent way as the encoding of the initial structure map. Since the position of the fingerprint measurements may be structurally sparser than the reconstructed point cloud, it might be beneficial if the hierarchical encoding happens in less stages, but this may be a design choice that might differ in different embodiments. For example, the RF measurement 3D locations may be different from the structure 3D points. The feature center points of the RF maps and structure maps may not be the same locations; thus, the features of the two modalities may be fused in a later stage.

The present subject matter may comprise the following examples.

Example 1: An apparatus comprising: at least one processor; and at least one memory storing instructions that, when executed by the at least one processor, cause the apparatus at least to perform: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph, whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

Example 2: A non-transitory computer readable medium comprising program instructions that, when executed by an apparatus, cause the apparatus to perform at least the following: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

The present subject matter may comprise the following clauses.

Clause 1. An apparatus comprising means being configured for: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph, whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors;

updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

Clause 2. The apparatus of clause 1, the means being further configured for: receiving an acquired initial structure map comprising initial spatial points representing the structure of the environment and initial feature vectors descriptive of the initial points; receiving at least one acquired initial RF map, the initial RF map comprising initial points representing locations of the environment where measurements of RF signals from a respective RF signal source are performed, the initial RF map further comprising initial feature vectors descriptive of the RF measurements; determining a first set of structure feature centers representing the initial points of the initial structure map; determining a first set of RF feature centers representing the initial points of the initial RF map; clustering the initial points of the initial structure map around the first set of structure feature centers, thereby obtaining a first set of structure clusters; clustering the initial points of the initial RF map around the first set of RF feature centers of the initial RF map, thereby obtaining a first set of RF clusters; performing a combination of the initial feature vectors of the first set of structure clusters to obtain a first set of structure convolutional feature vectors representing the first set of structure feature centers; performing a combination of the initial feature vectors of the first set of RF clusters to obtain a first set of RF convolutional feature vectors representing the first set of RF feature centers; providing the points of the first structure map as the first set of structure feature centers, and the feature vectors of the first structure map as the first set of structure convolutional feature vectors; providing the points of the first RF map as the first set of RF feature centers, and the feature vectors of the first RF map as the first set of RF convolutional feature vectors.

Clause 3. The apparatus of clause 2, wherein the means are configured for: determining the structure feature center by at least: combining the points that represent a respective area of the environment to obtain the structure feature center; and determining the RF feature center by at least: combining the points that represent a respective area of the environment to obtain the RF feature center.

Clause 4. The apparatus of clause 2 or 3, the acquired initial structure map being a three-dimensional, 3D, point cloud.

Clause 5. The apparatus of any of the preceding clauses 2 to 4, the combination of feature vectors being performed by a trained first encoder, herein referred to as first local encoder, the first local encoder being configured to process each cluster of points of the clusters and to output a convolutional feature vector.

Clause 6. The apparatus of any of the preceding clauses 1 to 5, wherein the state vector is updated using a first encoder, referred to as first global encoder, the first global encoder is configured to receive as input the state vector of the specific node and the state vectors of the intra-graph and inter-graph neighborhood nodes of the specific node, and to provide the updated state vector of the specific node.

Clause 7. The apparatus of clause 6, wherein the first global encoder is a trained graph neural network updating state vectors of the first input graph.

Clause 8. The apparatus of clause 6 or 7, the trained machine learning model being a decoder, wherein the first local encoder, the first global encoder and the decoder are jointly trained to determine their learnable parameters such that a deviation between the predicted signal propagation characteristics and known signal propagation characteristics is optimized.

Clause 9. The apparatus of any of the preceding clauses 2 to 8, the means being further configured for: determining a second set of structure feature centers representing the points of the first structure map; determining a second set of RF feature centers representing the points of the first RF map; clustering the points of the first structure map around the second set of structure feature centers, thereby obtaining a second set of structure clusters; clustering the points of the first RF map around the second set of RF feature centers of the first RF map, thereby obtaining a second set of RF clusters; performing a combination of the feature vectors of the second set of structure clusters to obtain a second set of structure convolutional feature vectors representing the second set of structure feature centers; performing a combination of the feature vectors of the second set of RF clusters to obtain a second set of RF convolutional feature vectors representing the second set of RF feature centers; providing the points of a second structure map as the second set of structure feature centers, and the feature vectors of the second structure map as the second set of structure convolutional feature vectors; providing the points of a second RF map as the second set of RF feature centers, and the feature vectors of the second RF map as the second set of RF convolutional feature vectors.

Clause 10. The apparatus of clause 9, the means being further configured for: creating using a second structure edge connecting rule a second structure graph whose nodes represent the points of the second structure map, the nodes being associated with state vectors obtained using the feature vectors of the points of the second structure map; creating using a second RF edge connecting rule a second RF graph, the second RF graph having nodes representing the points of the second RF map, wherein the nodes of the second RF graph are associated with state vectors obtained using the feature vectors of the second RF map; creating a second input graph from the second structure graph and the second RF graph by using the second edge connecting rule; updating state vectors of the nodes of the second input graph, the updating of the state vector being performed using state vectors of intra-graph neighborhood nodes of the respective node and inter-graph neighborhood nodes of the node; wherein the output graph is connected further using the second input graph, wherein the second structure map comprises a number of points smaller than or equal to the number of points of the first structure map, wherein the number of points of the second RF map is smaller than or equal to the number of points of the first RF map.

Clause 11. The apparatus of clause 10, wherein the inter-graph neighborhood nodes of the node of the first structure graph comprise nodes of at least one of: the first RF graph, the second structure graph or the second RF graph; wherein the inter-graph neighborhood nodes of the node of the first RF graph comprise nodes of at least one of: the first RF graph different from the specific first RF graph, the second structure graph, the second RF graph, or the first structure graph.

Clause 12. The apparatus of clause 10 or 11, wherein the state vector of a specific node is updated using a second encoder, referred to as second global encoder, the second global encoder is configured to receive as input the state vector of the specific node and the state vectors of the neighborhood nodes of the specific node, and to predict the state vector of the specific node.

Clause 13. The apparatus of any of the preceding clauses 1 to 12, wherein a first edge connecting rule is the first RF edge connecting rule or the first structure edge connecting rule, the first edge connecting rule being the output edge connecting rule or being different from the output edge connecting rule, the first edge connecting rule being the second edge connecting rule or being different from the second edge connecting rule.

Clause 14. A method comprising: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

Clause 15. A computer program comprising instructions for causing an apparatus for performing at least the following: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g) NodeB) 114 providing or serving devices in a cell. In one example, the node 114 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 20 (CN or next generation core NGC). For example, the (e/g) NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented. 5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHZ, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHZ-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labour between core network operations and base station operations may differ from that of the LTE or even be non-existent.

Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. One of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
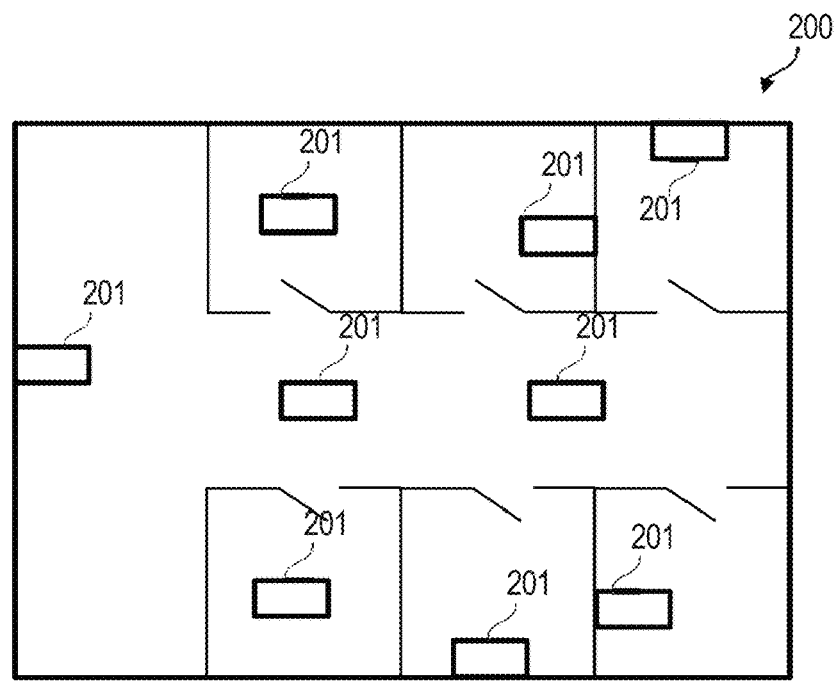
FIG. 2 is a schematic illustration of an environment in accordance with an example.

FIG. 2 is a schematic illustration of an environment 200 in accordance with an example of the present subject matter. FIG. 2 illustrates a top view of the environment 200 which may, for example, be a factory.

The environment 200 may, for example, be an indoor environment. The environment 200 may include a number of APs 201, such as access points as described with reference to FIG. 1, Wi-Fi APs, WLAn APs, LTE eNodeB's, home eNodeB's, APs associated with Hotspots, relay nodes, access nodes, other type of APs or nodes, Bluetooth beacon and/or other entities or devices capable of wireless communication.

Figure 3:
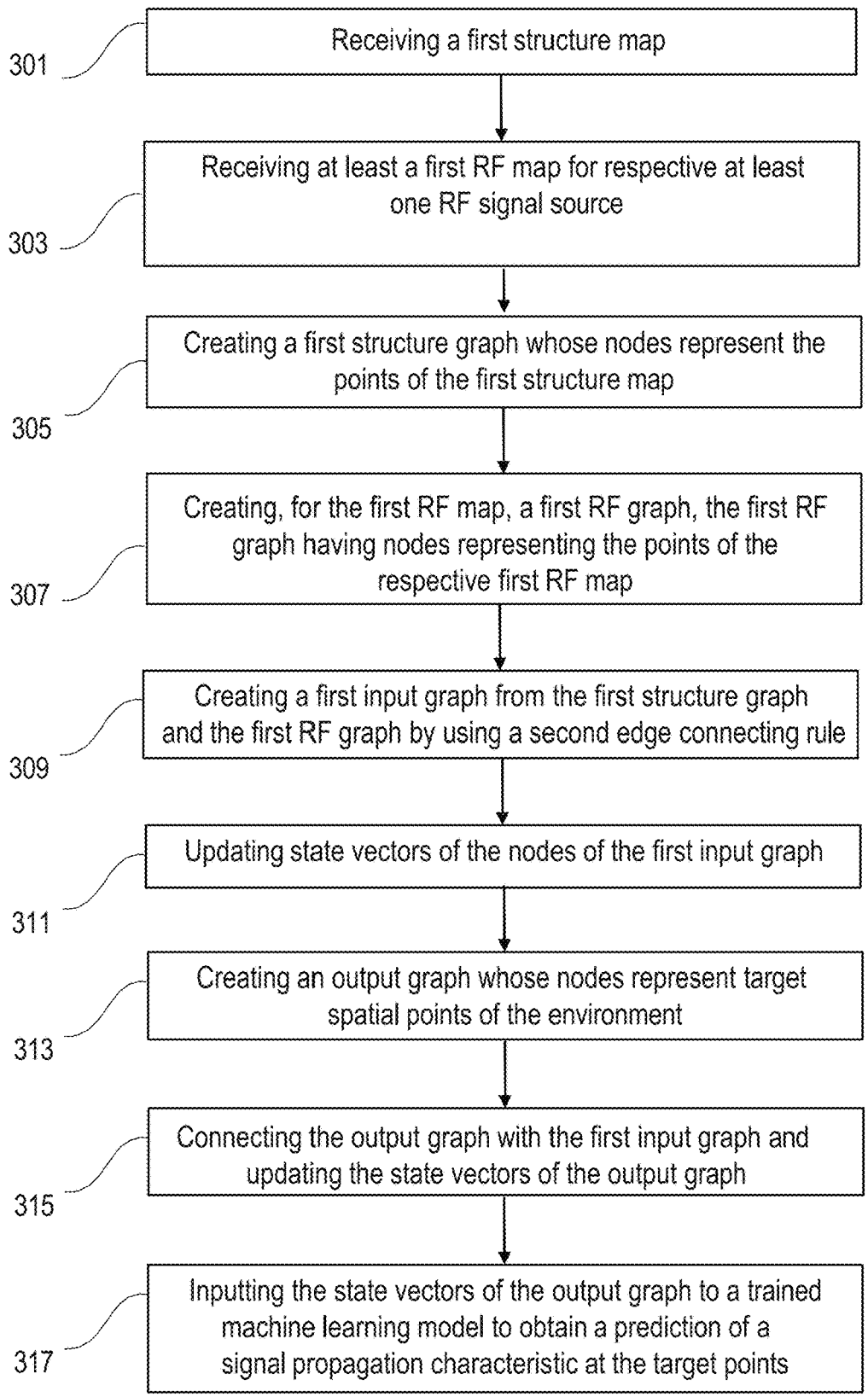
FIG. 3 is a flowchart of a method according to an example of the present subject matter.

FIG. 3 is a flowchart of a method according to an example of the present subject matter. For the purpose of explanation, the method described in FIG. 3 may be implemented using the environment illustrated in FIG. 2, but is not limited to this implementation.

A first structure map comprising spatial points representing a structure of an environment (e.g., 200) and feature vectors descriptive of the points may be received in step 301. At least one first RF map associated with the respective at least one RF signal source, may be received in step 303. The at least one first RF map comprises the number K of first RF maps, where K is an integer higher than or equal to one, K≥1. The number K of first RF maps is the number of RF signal resources. Each k-th first RF map may comprise spatial points representing locations of the environment where measurements of RF signals from the k-th RF signal source are performed. The k-th first RF map may further comprise feature vectors descriptive of the RF measurements. A first structure graph whose nodes represent the points of the first structure map may be created in step 305, where the nodes are associated with state vectors obtained using the feature vectors of the points of the first structure map.

At least one first RF graph may be created in step 307 for the at least one first RF map respectively. This may result in K first RF graphs. The k-th first RF graph has nodes representing the points of the respective k-th first RF map, and the nodes of the k-th first RF graph are associated with state vectors obtained using the feature vectors of the k-th first RF map.

A first input graph may be created in step 309 from the first structure graph and the at least one first RF graph by using a first edge connecting rule.

State vectors of the nodes of the first input graph may be updated in step 311. The update of the state vector of each node of the first input graph may be performed using state vectors of intra-graph neighborhood nodes of the node and inter-graph neighborhood nodes of the node.

Steps 301 to 311 may, for example, be performed by a first global encoder.

An output graph whose nodes represent target spatial points of the environment may be created in step 313. The nodes of the output graph are associated with state vectors respectively. The state vector of each node of the output graph may be obtained from the feature vector of the target spatial point of that node. The feature vector of the target spatial point may comprise the 3D coordinates of the point and values of the features of the point.

The output graph may be connected with at least the first input graph having the updated state vectors using an output edge connecting rule, and the state vectors of the output graph, after the connection is performed, may be updated in step 315. The update of the state vector of each node of the output graph may be performed using state vectors of intra-graph neighborhood nodes of the node and inter-graph neighborhood nodes of the node. Indeed, the connection of the output graph with the first input graph may enable to update of the state vectors of the output graph using state vectors of target spatial points and updated state vectors from the first input graph.

The state vectors of the output graph may be input in step 317 to a trained machine learning model to obtain a prediction of a signal propagation characteristic at the target points.

Steps 313 to 317 may, for example, be performed by an output decoder.

In one example implementation of FIG. 3, the first structure map and the at least one first RF map may be obtained by first local encoding method as described with reference to FIG. 4.

In one example implementation of step 311, the update of the state vector of each node of the first input graph may be performed using state vectors of intra-graph neighborhood nodes of the node and inter-graph neighborhood nodes of the node, wherein the inter-graph neighborhood nodes include nodes of an external graph. The inter-graph neighborhood nodes of the node of the first structure graph comprise nodes of at least one of: the first RF graph, the second structure graph or the second RF graph. The inter-graph neighborhood nodes of the node of the first RF graph comprise nodes of at least one of: the first RF graph different from the specific first RF graph, the second structure graph, the second RF graph, or the first structure graph. The external graph may be the second structure graph or the second RF graph which are provided by the second global encoder.

Figure 4:
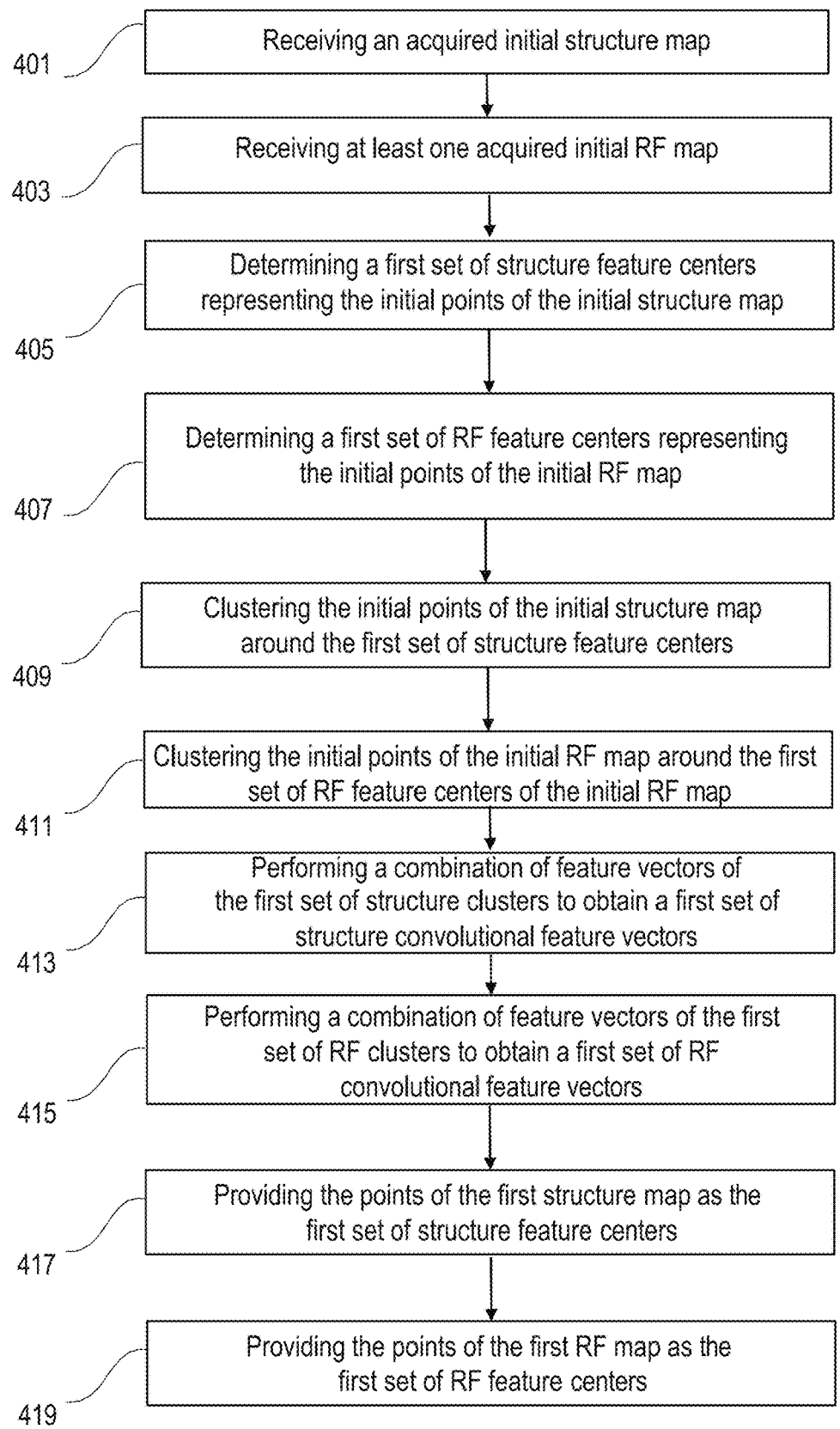
FIG. 4 is a flowchart of a method according to an example of the present subject matter.

FIG. 4 is a flowchart of a method according to an example of the present subject matter. For the purpose of explanation, the method described in FIG. 4 may be implemented using the environment illustrated in FIG. 2, but is not limited to this implementation. The method of FIG. 4 may, for example, be performed by a first local encoder.

An acquired initial structure map may be received in step 401. The initial structure map comprises initial spatial points representing the structure of the environment (e.g., 200) and initial feature vectors descriptive of the initial points.

At least one acquired initial RF map may be received in step 403. The at least one initial RF map comprises the number K of initial RF maps, where K is an integer higher than or equal to one, K≥1. The number K of initial RF maps is the number of RF signal resources. Each k-th initial RF map comprises initial points representing locations of the environment where measurements of RF signals from a respective k-th RF signal source are performed. The k-th initial RF map further comprises initial feature vectors descriptive of the RF measurements.

A first set of structure feature centers representing the initial points of the initial structure map may be determined in step 405.

At least one first set of RF feature centers representing the initial points of the at least one initial RF map respectively may be determined in step 407. This may result in a number K of first sets of RF feature centers which are derived using the K initial RF maps respectively.

The initial points of the initial structure map may be clustered in step 409 around the first set of structure feature centers, thereby obtaining a first set of structure clusters.

The initial points of each k-th initial RF map may be clustered in step 411 around the k-th first set of RF feature centers of the initial RF map, thereby obtaining a k-th first set of RF clusters. This may result in a number K of first sets of RF clusters.

A combination of feature vectors descriptive of the points of the first set of structure clusters may be performed in step 413 to obtain a first set of structure convolutional feature vectors representing the first set of structure feature centers. For example, a point convolution of the first set of structure clusters may be performed in step 413 to obtain a first set of structure convolutional feature vectors representing the first set of structure feature centers.

A combination of feature vectors descriptive of the points of each k-th first set of RF clusters may be performed in step 415 to obtain a k-th first set of RF convolutional feature vectors representing the k-th first set of RF feature centers. This may result in a number K of first sets of RF convolutional feature vectors. For example, a point convolution of each k-th first set of RF clusters may be performed in step 415 to obtain a k-th first set of RF convolutional feature vectors representing the k-th first set of RF feature centers.

In step 417, the points of the first structure map may be provided as the first set of structure feature centers, and the feature vectors of the first structure map may be provided as the first set of structure convolutional feature vectors.

In step 419, the points of each k-th first RF map may be provided as the k-th first set of RF feature centers and the feature vectors of the k-th first RF map may be provided as the k-th first set of RF convolutional feature vectors.

The first local encoding method of FIG. 4 may, for example, be associated with global settings and individual settings. The global settings may indicate at least one of the input maps of the first local encoding method, which clustering method to be used by the first local encoding method, which convolution method to be used by the first local encoding method or which feature center definition method may be used by the first local encoding method. The individual settings may for example be setting of method used by the first local encoding method. The individual settings may be at least one of: settings of the convolution method, the setting of the feature center definition method or the settings of the clustering method being used by the first local encoding method.

Figure 5:
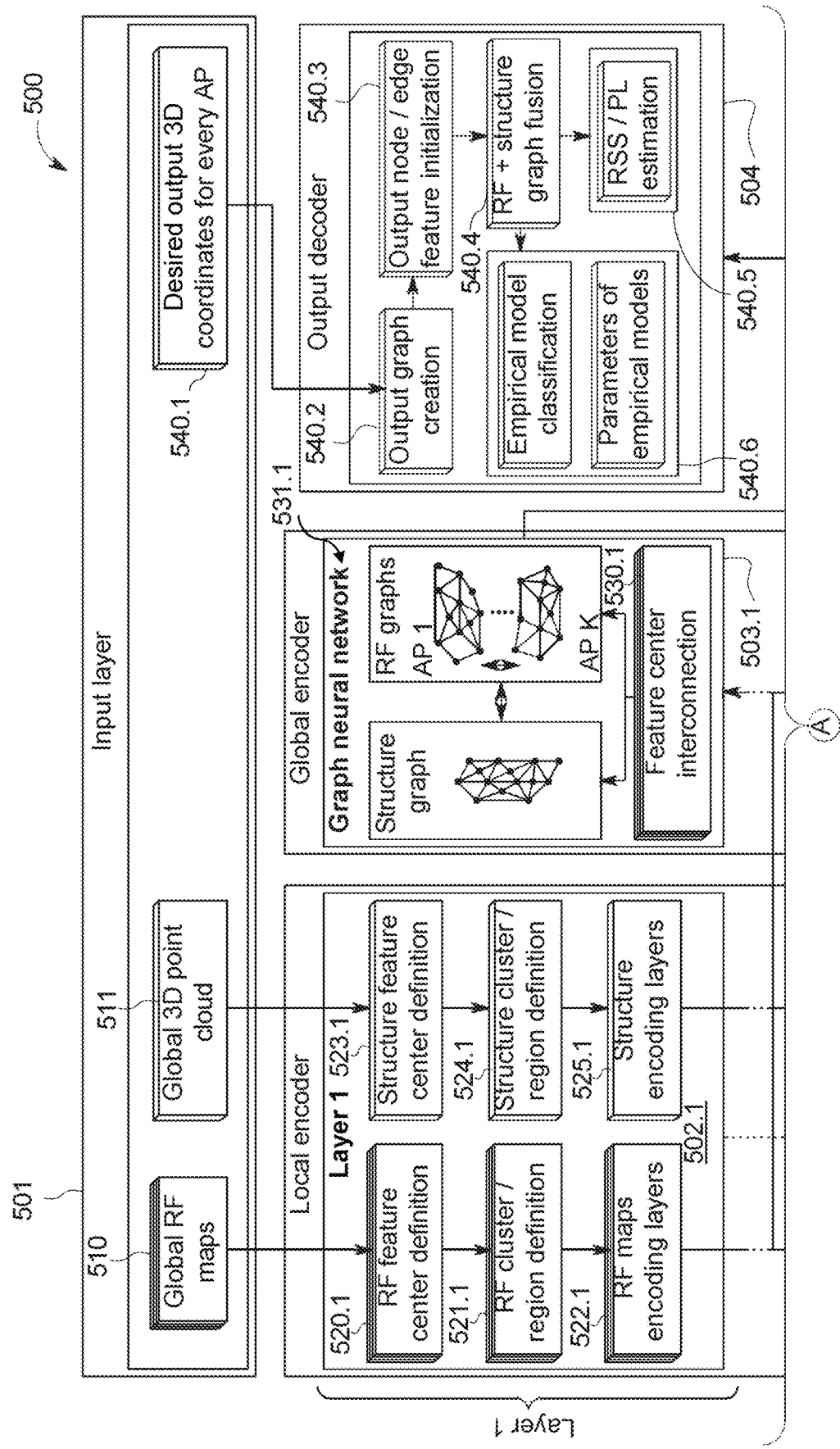
FIG. 5 is a diagram illustrating a multi-layer model for prediction of signal propagation characterlike at target coordinates of an environment.
Figure 5:
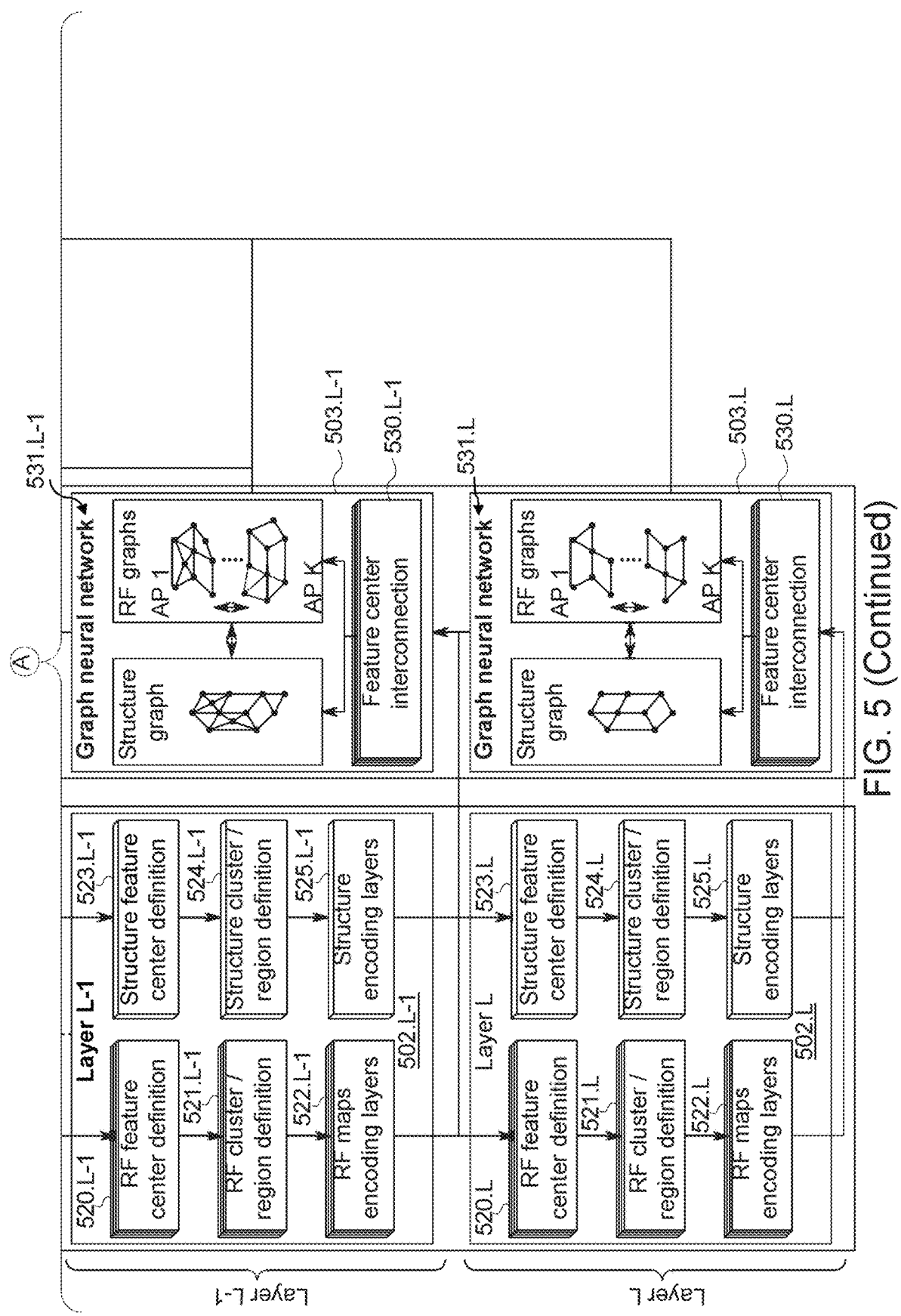

Hereinafter, an example architecture corresponding to FIG. 5 is explained in detail. Note that this example is not limiting.

To create an accurate RSS/PL predictor, and/or an empirical model selector together with its estimated parameters for a certain environment, a layered model 500 may be provided by the multi-layer architecture of FIG. 5.

The layered model 500 comprises an input layer 501, multiple encoding layers 1 though L and an output decoder 504. Each encoding layer comprises a local encoder and a global encoder. For example, the encoding layer 1 comprises local encoder 502.1 and global encoder 503.1, encoding layer 2 comprises local encoder 502.2 and global encoder 503.2, . . . , and encoding layer L comprises local encoder 502.L and global encoder 503.L.

The input layer may comprise a set of (K) initial RF maps 510 and one initial structure (or structural) map 511 for an environment such as the environment 200 of FIG. 2. The initial structure map 511 may be a 3D point cloud. Each of the local encoders 502.1 through 502.L may receive as input the set of initial RF maps 510 and one initial structure map 511. The output of each of the local encoders 502.1 through 502.L may be provided as input to the global encoders 503.1 through 503.L respectively. The output of each local encoder 502.1 through 502.L may be a set of structure feature centers obtained by processing the initial structure map 511 and K sets of RF feature centers obtained by processing the K initial RF maps 510. As illustrated in FIG. 5, each global encoder 503.1 through 503.L may create a structure graph representing the input set of structure feature centers and K RF graphs representing the input K sets of RF feature centers respectively. Each global encoder of the global encoders 503.1 through 503.L may create a respective graph neural network (531.1 through 531.L) for the structure graph and the K RF graphs of the global encoder. State vectors of the nodes of the graphs of each global encoder (of layer l) may use state vectors of nodes of said global encoder but also state vectors of graphs of another global encoder of the lower level l–1. Each global encoder 503.1 through 503.L may output a respective input graph 531.1-L after performing the state update. The output decoder 504 may receive a number L of input graphs 531.1-L from the global encoders 503.1 through 503.L respectively and connect or combine or fuse them with a desired output graph. After updating the state vectors of the connected graph, the output decoder 504 may use the updated state vectors to perform a prediction of the RSS/P values at the target points and/or a prediction of the empirical models and their parameters. The empirical models may be used to predict the RSS/PL values at the target points.

Further details of the different parts of the layered model 500 may be described as follows.

Input Layer (501)—Definition of Maps

The input layer 501 comprises RF maps associated with a number K of APs respectively, and a 3D could point. The maps may be obtained as follows.

The detailed RF measurements may be captured with an agent that contains an RF module and a camera. A SLAM map may be built based on the image sequence captured by the camera and register the RF measurements with 6DoF poses of the camera. The structural maps created by a SLAM pipeline contain the following relevant elements: (i.) 3D map points $\mathcal{P}^S = \{x_i^S \in \mathbb{R}^3 | i=1, \ldots, N\}$ and their corresponding descriptors or feature vectors $\mathcal{F}^S = \{f_i^S \in \mathbb{R}^D | i=1, \ldots, N\}$, (ii.) pose of keyframes. The associated feature vectors $\mathcal{F}^S \in \mathbb{R}^{|\mathcal{P}^S| \times D}$ could be feature point descriptors, semantic, material information, derived features such as offset from the arithmetic mean, offset from the center of a voxel, RGB colors, surface normal, reflectance value, etc., A structure SLAM map may be defined as a set of 3D map points and their corresponding feature vectors $\mathcal{M}^S = (\mathcal{P}^S, \mathcal{F}^S)$.

Radio fingerprints contain the average RSS values from the surrounding Wi-Fi access points (APs), base stations, Bluetooth devices, etc. In case of K number of access points in the mapped region, the RF maps $\mathcal{M}^{RF} = (\mathcal{P}^{RF}, \mathcal{F}^{RF})$ can be defined as a set of RF points $\mathcal{P}^{RF} = \{x_i^{RF} \in \mathbb{R}^3 | i=1, \ldots, M\}$, namely the 3D coordinates of the places where RF measurements were recorded, and their associated feature vector $\mathcal{F}^{RF} = \{(q_i^{RF}, f_i^{RF}) \in \mathcal{S}^3 \times \mathbb{R}^K | i=1, \ldots, M\}$, where $q_i^{RF} \in \mathcal{S}^3$ is an element of the unit quaternion group, representing the orientation of the recording sensors while registering the measured RSS values of the APs stored in the fingerprint feature vector $f_i^{RF} = (RSS_1, RSS_2, \ldots, RSS_K)$. The $\mathcal{F}^{RF_k} = \{(q_i^{RF_k}, f_i^{RF_k}) \in \mathcal{S}^3 \times \mathbb{R} | i=1, \ldots, M\}$ notation refers to the measurements of the k-th AP.

Optionally, if the pose of the APs in the map are known, the 3D coordinates of APs are defined in set $\mathcal{P}^{AP} = \{x_i^{AP} \in \mathbb{R}^3 | i=1, \ldots, K\}$ and its feature vector is defined as $\mathcal{F}^{AP} = \{(q_i^{AP}, f_i^{AP}) \in \mathcal{S}^3 \times \mathbb{R} | i=1, \ldots, K\}$ where $q_i^{AP}$ denotes the quaternion orientation of the AP and $f_i^{AP}$ the transmitted power in dBm. By knowing the 3D coordinates and the orientation of the APs, distance-, orientation- and propagation-based encodings can be defined for the attention encodings and the implicit fading and interference models. If information related to the APs is not available, the model, due to its flexible architecture, can still predict and regress the requested information. The reference signals of APs can be assumed omnidirectional, but it does not have to be omnidirectional, as they may have the same directional characteristics at training and at test time. The neural network will implicitly learn the antenna characteristics. By knowing the orientation $q_i^{AP}$ of an access point, we can give hints to the network how the antenna characteristics are rotated in 3D space, so it might be able to more easily learn directional characteristics shared among APs of the same type.

Local Encoders (502.1-L)

The aim of the local encoder may be twofold: (i.) to find and encode regions, structures, surfaces that alter the RF signal propagation and (ii.) to handle the irregular structure of the measured data. Both structure and RF measurements are represented as 3D points with feature descriptors. Encoding point clouds and irregular measurements is challenging because the data is not well structured like image data. Several encoding techniques exist for unstructured point clouds, for example projection networks, (where points are projected to regular 2D and 3D grid structures followed by regular 2D or 3D convolutional operators), graph convolution networks, point-wise multi-layer perceptron networks, or point convolutional networks. A workflow is provided for enabling the usage of any of the above-mentioned techniques, namely: feature centers definition (520.1-L and 523.1-L), definition of the clusters or neighborhood regions for the feature centers (521.1-L and 524.1-L), and the encoding process (522.1-L and 525.1-L). In the following, several alternatives that could be implemented in different embodiments may be provided.

Feature Center Definition for RF and Structure Maps (520.1-L and 523.1-L)

To create an efficient deep-learning architecture for irregular data such as point clouds or sparse RF measurements scattered in an environment, some structure must be introduced.

Grid-Based Feature Centers

A regular data structure can be achieved by defining a 3D grid partitioning mechanism. For every layer of the local encoder network, a 3D grid is defined with predefined grid cell size. The cells of the 3D grids are called voxels. As a next step, the available measurement data or the points in the point cloud are partitioned by their coordinates into the voxels. The feature centers are computed based on the partitioned voxel data for every voxel with available measurement points. In certain embodiments, the feature centers for every voxel could be calculated as the arithmetic mean of the 3D coordinates of the voxel's data points. Alternatively, a model could also regress the position of the feature centers based on the voxel data. In yet another embodiment, the feature centers could be simply defined as the center points of the voxels. The above-described approaches may also be valid for a 2D grid partitioning system. In this case, the feature point coordinates' height is not used for data point partitioning.

Feature Point Detectors

A different approach is to define feature points based on the position of the measurement positions or the measurement values. For feature point estimation, a straightforward approach is to compute or estimate local gradients based on a user-defined neighborhood and to select those points where these gradients are below or above a certain threshold. While gradient-based algorithms are efficient because of the required low computational power, they lack context understanding. To find better feature point centers (compared to gradient-based methods), data-driven object detectors could be used to find objects of interest in point clouds. A wide variety of deep learning models are already available in the literature that can find different objects and geometric primitives in point clouds.

RF/Structure Cluster/Region Definition (521.1-L and 524.1-L)

After determining the feature centers, the next step is to assign each data point to one of the feature centers. It might happen that based on the clustering or neighborhood criteria, not every data point can be assigned to a feature center. In this case, these points will not be used in the encoding steps. In the following, we are listing a couple of neighborhood definition strategies that could be implemented in different embodiments.

In the case of radius-based neighborhood definition a 3D sphere with a predefined radius is defined around each feature center. For 2D spaces, a circle is defined around the feature centers. Data points that lie inside the sphere/circle are assigned to the corresponding feature centers. In this case, one data point might be assigned to multiple feature centers. If this is an undesired effect, one might choose to assign the data point only to the closest feature center point. Another possibility is to assign each data point to the closest feature center, and we do not consider any predefined radius. With this approach, for every data point a feature center will be assigned, but outlier measurements might degrade the encoding performance. If computational efficiency is important, then assigning only a fixed number K of nearest data points to a feature center might be a solution.

Encoding (522.1-L and 525.1-L)

The encoding at each local encoder 502.1 through 502.L may be defined by a collection of convolutional, normalization, activation, and data compression operations. Encoding irregular measurement data may be challenging because the data may not well be structured like image data. Several encoding techniques exist like projection networks, (where points are projected to regular 2D and 3D grid structures) followed by regular 2D or 3D convolutional operators, graph convolution networks, point-wise multi-layer perceptron networks, or point convolutional networks. The main goal of the encoding may be to create representations that encode the structure of the environment and the measured RF signals in a hierarchical and transformation-invariant way (e.g., rigid-body transformations in 3D Euclidean space).

The point convolutions may be used for encoding the point cloud features and the RF map features, but it is not limited to as other types of convolutions may be used for the encoding. For point convolutions, input positions may be used in order compute the feature convolutions around them. For that, a neighborhood region may be defined around the input positions in order to select the data points that may be used for output feature vector computation. Based on the feature vectors of the support points, a feature vector may be created for the output feature point. Since the number of output points equals the number of the feature centers chosen as input centers this operation can be regarded as a down-sampling or up-sampling operation. Since the point cloud data may be unstructured, the convolutional operator may be need to be redefined. For that, the Kernel Point Convolution (KPConv) approach presented in document Hugues Thomas et al. "*KPConv: Flexible and Deformable Convolution for Point Clouds*, 2019 IEEE/CVF International Conference on Computer Vision (ICCV)" may be used for encoding the point cloud features and the RF map features, but it is not limited to as different types of convolutions may be used. For points $x_i \in \mathcal{P}^{N \times 3}$ and their corresponding features $f_i \in \mathcal{F}^{N \times D}$, the convolution of $\mathcal{F}$ by a kernel g at center point $x \in \mathbb{R}^3$ is defined as $(\mathcal{F} * g)(x) = \sum_{x_i \in \mathcal{N}_x} g(x_i - x) f_i$. $\mathcal{N}_x$ is the neighborhood of center point that can be defined in several ways. For example, the k-nearest neighbors of center point x may be used or a sphere with radius r may be defined around the center point, therefore the neighborhood set is defined as $\mathcal{N}_x = \{x_i \in P \mid \|x_i - x\| \leq r\}$. As the radius r defines the neighborhood, the domain of operation of kernel function 9 is defined by unit sphere $\mathcal{B}_r^3 = \{y \in \mathbb{R} \mid \|y\| \leq r\}$. The kernel function 9 for a point $y_i \in \mathcal{B}_r^3$ is defined as $g(y_i) = \sum_{k < K} h(y, \tilde{x}_k) W_k$, where $\{\tilde{x}_k \mid k < K\} \subset \mathcal{B}_r^3$ are the kernel points and $\{W_k \mid k < K\} \subset \mathbb{R}^{D_{in} \times D_{out}}$ the associated weight matrices that map features from dimension $D_{in}$ to $D_{out}$ and h is a linear correlation function with user-defined parameter $\sigma$ defined as $$h(y_i, \tilde{x}_k) = \max\left(0, 1 - \frac{\|y_i - \tilde{x}_k\|}{\sigma}\right).$$

In one example, normalization layers may be used for increasing the convergence of the training using for example using an approach as described in Sergey Ioffe et al. *Batch Normalization: Accelerating Deep Network Training by Reducing Internal Covariate Shift*, 2015

The encoding at the local encoder may be applied in parallel to the structural and RF maps. The encoding of the RF maps (e.g., RF measurements registered at 3D locations) may happen in an equivalent way as the structural encoding. Since the position of the fingerprint measurements may be structurally sparser than the reconstructed point cloud (e.g., the RF measurement 3D locations may be different from the structure 3D points), it might be beneficial if the hierarchical encoding happens in less stages. The feature center points of the RF maps and structure maps may not be the same locations; thus, the features of the two modalities may be fused in a later stage.

The output of local encoder of the l-th layer consists of the following: structure feature centers $\mathcal{P}^{S_l} = \{x_i^{S_l} \in \mathbb{R}^3 \mid i=1, \ldots, N_l\}$, structural feature vectors for every feature center $$\mathcal{F}^{S_l} = \{f_i^{S_l} \in \mathbb{R}^{D_{S_l}} \mid i = 1, \ldots, N_l\},$$

RF feature centers for every AP $\mathcal{P}^{RF_l^k} = \{x_i^{RF_l^k} \in \mathbb{R}^3 \mid i=1, \ldots, M_l^k\}$ and RF feature vectors $$\mathcal{F}^{RF_l^k} = \{f_i^{RF_l^k} \in \mathbb{R}^{D_{RF_l^k}} \mid i = 1, \ldots, M_l^k\}.$$

The following relations apply for the number of feature centers: $N_l \geq N_{l+1}$ and $M_l^k \geq M_{l+1}^k$.

Global Encoders (503.1-L)

The goal of the global encoders may be to create an information sharing and state update mechanism, that can capture implicitly a wide variety of signal propagation effects such as fading and interference by taking into consideration the locally encoded obstacles. To achieve this, multi-modal graphs may be created based on the locally encoded features of selected layers. The multi-modality means that a separate graph is created: (i.) based on the structural measurements $\mathcal{G}^S = (\mathcal{V}^S, \mathcal{E}^S)$, where $\mathcal{E}^S \subseteq \mathcal{V}^S \times \mathcal{V}^S$ denotes a set of structure edges, which specifies pairs of structure feature center nodes $\mathcal{V}^S$, (ii.) and based on the RF measurements $\mathcal{G}^{RF^k} = (\mathcal{V}^{RF^k}, \mathcal{E}^{RF^k})$, where $\mathcal{E}^{RF^k} \subseteq \mathcal{V}^{RF^k} \times$ $\mathcal{V}^{RF^k}$ denotes a set of RF edges, which specifies pairs of RF feature center nodes $\mathcal{V}^{RF^k}$ of the k-th AP. $\mathcal{G}^{S_l}$ and $\mathcal{G}^{RF_l^k}$ represent graphs that were built on feature centers and encoded at the local encoder of the l-th layer. The nodes of the graph may have properties inherited from the local encoders, namely for every structural node $v_i^{S_l} \in \mathcal{V}^{S_l}$ a state vector $h_i^{S_l}$ may be created based on the feature vectors $f_i^{S_l} \in \mathbb{R}^{D^{S_l}}$, and feature centers $x_i^{S_l} \in \mathbb{R}^3$; and for every RF node $v_i^{RF_l^k} \in \mathcal{V}^{RF_l^k}$ a state vector $h_i^{RF_l^k}$ may be created based on the feature vectors $$f_i^{RF_l^k} \in \mathbb{R}^{D^{RF_l^k}}$$

and the feature centers $x_i^{RF_l^k} \in \mathbb{R}^3$. If information about the APs is available, then one extra node may be added to the RF graphs together with position and feature properties from $\mathcal{P}^{AP}$ and $\mathcal{F}^{AP}$. Since the 3D position is available, signed or unsigned distance information may be added to edges as a property. Distance information may be used in the implicit modeling of the fading and interference phenomena.

After the definition of intra- and inter-graph edges, the nodes' feature vectors (referred to as node states) may be updated with the purpose of having good model selection and RSS predictions for the requested positions. When updating the states of the nodes, a three-step process may take place: (i.) first the feature vectors of the neighboring nodes are collected and transformed by functions with learnable parameters, (ii.) the transformed feature vectors are aggregated, (iii.) finally, the aggregated feature vectors are combined with the original state vectors through learnable functions.

State update mechanisms may be defined as follows: $h_i = \phi(h_i, \oplus_{v_j \in \mathcal{N}_{v_i}} a(h_i, h_j)\psi(h_j))$, referred to as the attentional update and $h_i = \phi(h_i, \oplus_{v_j \in \mathcal{N}_{v_i}} \psi(h_i, h_j))$, referred to as the message-passing update, where $\phi$ and $\psi$ denote neural networks with learnable parameters and $\oplus$ is any permutation-invariant aggregator, such summation, averaging or as maximum selection, $\mathcal{N}_{v_i} = \{v_j | (v_i, v_j) \in \mathcal{E}\}$ is the neighborhood set of node $v_i$ in the graph, and $a_{ij} = a(h_i, h_j)$ denotes the attention mechanism that also contains learnable parameters.

In the following, further details provide definition of $\phi$, $\psi$ and $a_{ij} = a(h_i, h_j)$ for the PL/RSS prediction problem, and describe how the learnable parameters may implicitly model the fading and interference characteristics of the wireless channels.

Feature Center Interconnection (530.1-L)

The module (530.1-L) called feature center interconnection connects feature center points of similar and of different modalities. It may work on different hierarchical levels, but its goal may be to connect graph nodes where information sharing may happen. The hierarchical levels are defined as follows: (i.) intra-modality connections, (ii.) inter-modalities connections and (iii.) inter-layer connections between graphs of different layers.

Different techniques may be used node connection strategies. For example, a metric between two nodes may be used. When this metric meets a certain threshold, then these nodes are connected, otherwise there is no edge defined between the nodes. Distance-like metrics may be computed between nodes based on the 2D/3D coordinates of the nodes or based on the high-dimensional feature vector distance. Further possibilities may be to connect the closest k neighbors, or to connect every node to every other node. By connecting more nodes, the information collection and information sharing may happen in a larger spatial region, resulting in better prediction accuracy, with the price of higher computational complexity.

In the case of intra-modality connections, edges between similar type of feature centers may be referred to as: $\mathcal{E}^{S_l}$ the edges between structural nodes at layer l of the local encoder, $\mathcal{E}^{RF_l^k}$ the edges between the RF feature centers belonging to the k-th AP at layer l of the local encoder. In this case, the neighborhood sets for the structural node $v^{S_l}$ is defined as $N_{v_i}^{S_l \to S_l} = \{v_j^{S_l} | (v_i^{S_l}, v_j^{S_l}) \in \mathcal{E}^{S_l \to S_l}\}$ and for the RF node $$v_i^{RF_l^k}$$

is defined as $$N_{v_i}^{RF_l^k \to RF_l^k} = \left\{ v_j^{RF_l^k} \middle| \left( v_i^{RF_l^k}, v_j^{RF_l^k} \right) \in \mathcal{E}^{RF_l^k \to RF_l^k} \right\}.$$

In the case of inter-modality connections, neighborhood sets are defined between structural nodes $v^{S_l}$ and RF nodes $$v^{RF_l^k}$$

where k=1, ..., K; and between RF nodes $$v^{RF_l^k} \text{ and } v^{RF_l^j}$$

where k=1, ..., K\j. In this case the inter-modal neighborhood sets for the structural node $v^{S_l}$ are defined as $$N_{v_i}^{S_l \to RF_l^k} = \left\{ v_j^{RF_l^k} \middle| \left( v_i^{RF_l^k}, v_j^{RF_l^k} \right) \in \mathcal{E}^{RF_l^j \to RF_l^k} \right\}$$

where k=1, ..., K, for structural nodes $$v^{RF_l^j}$$

the inter-modal neighborhood sets are defined as $$N_{v_i}^{RF_l^j \to RF_l^k} = \left\{ v_j^{RF_l^k} \middle| \left( v_i^{RF_l^k}, v_j^{RF_l^k} \right) \in \mathcal{E}^{RF_l^j \to RF_l^k} \right\} \text{ where } k = 1, ..., K/j \text{ and}$$

$$N_{v_i}^{RF_l^k \to S_l} = \left\{ v_j^{S_l} \middle| \left( v_i^{RF_l^k}, v_j^{S_l} \right) \in \mathcal{E}^{RF_l^k \to S_l} \right\}.$$

The aim of the inter-layer node connections may be to implement a bottom-up information sharing mechanism. Feature vectors on higher levels have more contextual information and by sharing this information to lower-level nodes, better predictions could be made. For example, only nodes in adjacent layers with similar modalities may be connected, but in different examples, further connections may be made between further layers or between different modalities as well. For the structural nodes $v^{S_l}$ at layer l, the layer-wise neighborhood set may be defined as $$N^{S_l \to S_{l+1}} = \left\{ v_j^{S_{l+1}} \middle| \left( v_i^{S_l}, v_j^{S_{l+1}} \right) \in \mathcal{E}^{S_l \to S_{l+1}} \right\},$$

$$N_{v_i}^{S_l \to RF_{l+1}^k} = \left\{ v_j^{RF_{l+1}^k} \middle| \left( v_i^{S_l}, v_j^{RF_{l+1}^k} \right) \in \mathcal{E}^{S_l \to RF_{l+1}^k} \right\};$$

and for the RF nodes $$v^{RF_l^k}$$

at layer l, the inter-layer neighborhood set may be defined as $$N_{v_i}^{RF_l^k \to RF_{l+1}^k} = \left\{ v_j^{RF_{l+1}^k} \middle| \left( v_i^{RF_l^k}, v_j^{RF_{l+1}^k} \right) \in \mathcal{E}^{RF_l^k \to RF_{l+1}^k} \right\} \text{ and } N_{v_i}^{RF_l^k \to S_{l+1}} = \left\{ v_j^{S_{l+1}} \middle| \left( v_i^{RF_l^k}, v_j^{S_{l+1}} \right) \in \mathcal{E}^{RF_l^k \to S_{l+1}} \right\}.$$

Using the intra-modal, the inter-modal, and the inter-layer information sharing edges, the information sharing process that is based on the attention mechanism may be defined.

Graph Neural Networks (531.1-L)—State Update

For nodes $v^{S_l}$ and $$v^{RF_l^k},$$

the initial state vectors $h^{S_l}$ and $$h^{RF_l^k}$$

are created based on the feature vectors $f^{S_l}$, $f^{RF_l^k}$ and the feature center positions $x^{S_l}$ and $x^{RF_l}$. The feature center interconnection module defines the edges between the nodes creating the previously defined neighborhood sets:

$$N_{v_i}^{S_l \to S_l}, N_{v_i}^{S_l \to RF_l^k}, N_{v_i}^{RF_l^j \to RF_l^k}, N_{v_i}^{RF_l^j \to S_l},$$

$$N_{v_j}^{RF_l^k \to RF_{l+1}^k}, N_{v_i}^{S_l \to S_{l+1}} \text{ and } N_{v_i}^{RF_l^k \to S_{l+1}}.$$

The details of information sharing between the nodes and possible variations may be described as follows.

General Definition of the Attention Mechanism

The general update equations are defined separately for the structural and for the RF nodes. The general update equations show how to update the nodes' state for one iteration; however, the number of total iterations is a design choice. For all new iterations, new weight matrices with learnable parameters may be defined. By increasing the neighborhood set size, the number of iterations could be lowered and vice versa.

For a structural node, the general update equation may be defined as follows:

$$h_i^{S_l} = W_V^{S_l \to S_l} h_i^{S_l} + \underbrace{\sum_{v_j^{S_l} \in N_{v_i}^{S_l \to S_l}} \alpha_{ij}^{S_l \to S_l} W_V^{S_l \to S_l} h_j^{S_l}}_{\text{structure-structure}} +$$

$$\underbrace{\sum_{k=1}^{K} \sum_{v_j^{RF_l^k} \in N_{v_i}^{S_l \to RF_l^k}} \alpha_{ij}^{S_l \to RF_l^k} W_V^{S_l \to RF_l^k} h_j^{RF_l^k}}_{\text{structure-RF}} +$$

$$\underbrace{\sum_{k=1}^{K} \sum_{v_j^{RF_{l+1}^k} \in N_{v_i}^{S_l \to RF_{l+1}^k}} \alpha_{ij}^{S_l \to RF_{l+1}^k} W_V^{S_l \to RF_{l+1}^k} h_j^{RF_{l+1}^k}}_{\text{layer-wise structure-RF}} +$$

$$\underbrace{\sum_{v_j^{S_{l+1}} \in N_{v_i}^{S_l \to S_{l+1}}} \alpha_{ij}^{S_l \to S_{l+1}} W_V^{S_l \to S_{l+1}} h_j^{S_{l+1}}}_{\text{layer-wise structure-structure}}$$

where $\alpha_{ij}^{S_l \to S_l}$, $\alpha_{ij}^{S_l \to RF_l^k}$, $\alpha_{ij}^{S_l \to RF_{l+1}^k}$ and $\alpha_{ij}^{S_l \to S_{l+1}}$ are attention weights and $$W_V^{S_l \to S_l}, W_V^{S_l \to RF_l^k}, W_V^{S_l \to RF_{l+1}^k}, W_V^{S_l \to S_{l+1}} \in \mathbb{R}^{D_{out} \times D_{in}}$$

are the value matrices with learnable weight parameters for this specific iteration. ($D_{in}$ might be different for the different types of nodes).

For an RF node, the general update equation may be defined as follows:

$$h_i^{RF_l^k} = W_V^{RF_l^k \to RF_l^k} h_i^{RF_l^k} + \underbrace{\sum_{n=1}^{K} \sum_{v_j^{RF_l^n} \in N_{v_i}^{RF_l^k \to RF_l^n}} \alpha_{ij}^{RF_l^k \to RF_l^n} W_V^{RF_l^k \to RF_l^n} h_j^{RF_l^n}}_{\text{RF-RF}} +$$

$$\underbrace{\sum_{n=1}^{K} \sum_{v_{v_i}^{RF_{l+1}^n \to RF_{l+1}^n}} \alpha_{ij}^{RF_l^k \to RF_{l+1}^n} W_V^{RF_l^k \to RF_{l+1}^n} h_j^{RF_{l+1}^n}}_{\text{layer-wise RF-RF}} +$$

$$\underbrace{\sum_{v_j^{S_l} \in N_{v_i}^{RF_l^k \to S_l}} \alpha_{ij}^{RF_l^k \to S_l} W_V^{RF_l^k \to S_l} h_j^{S_l}}_{\text{RF-structure}} +$$

$$\underbrace{\sum_{v_j^{S_{l+1}} \in N_{v_i}^{RF_l^k \to S_{l+1}}} \alpha_{ij}^{RF_l^k \to S_{l+1}} W_V^{RF_l^k \to S_{l+1}} h_j^{S_{l+1}}}_{\text{layer-wise RF-structure}}$$

where $$\alpha_{ij}^{RF_l^k \to S_l}, \alpha_{ij}^{RF_l^k \to RF_{l+1}^n}, \alpha_{ij}^{RF_l^k \to S_{l+1}} \text{ and } \alpha_{ij}^{RF_l^k \to RF_l^n}$$

are attention weights and $$W_V^{RF_l^k \to S_l}, W_V^{RF_l^k \to RF_{l+1}^n}, W_V^{RF_l^k \to S_{l+1}} \text{ and } W_V^{RF_l^k \to RF_l^n} \in \mathbb{R}^{D_{out} \times D_{in}}$$

are the value matrices with learnable weight parameters for this specific iteration. The weight matrices may be distinguished for the different iterations. Also, a different $D_{in}$ may be used for the different input state vectors. To simplify notation, instead of explicitly denoting $h_i(v_i)$ meaning that state vector $h_i$ belongs to node $v_i$, the node argument may be ignored.

Since the attention weights are calculated in the same way for every configuration, a general template formula may be defined as follows:

$$\alpha_{ij}^{A \to B} = \frac{\exp(\overbrace{((W_Q^{A \to B} h_i^A))^T}^{q_i^{A \to B}} \overbrace{(W_K^{A \to B} h_j^B)}^{k_j^{A \to B}})}{\sum_{v_k^B \in N_{v_i}^{A \to B}} \exp((W_Q^{A \to B} h_i^A)^T (W_K^{A \to B} h_k^B(v_k^B)))}$$

where $W_Q^{A \to B}$ is a query matrix and $W_K^{A \to B}$ is a key matrix with learnable weight parameters. The weights of these matrices are learnt during training and every iteration could have new query and key matrices like the value matrices. Without loss of generality, the input and output dimensions of these matrices are assumed to be equal.

Implicit fading and interference models may be built during the training. The implicit fading models are encoded in the weights that connect structure and RF states, like $$W_V^{RF_l^k \to S_l}, W_Q^{RF_l^k \to S_l}, W_K^{RF_l^k \to S_l} \text{ and } W_V^{S_l \to RF_l^k}, W_Q^{S_l \to RF_l^k}, W_K^{S_l \to RF_l^k}$$

while the implicit interference models are encoded in $$W_V^{RF_l^k \to RF_l^n}, W_Q^{RF_l^k \to RF_l^n} W_K^{RF_l^k \to RF_l^n} \text{ and } W_V^{RF_l^k \to RF_{l+1}^n},$$

$$W_Q^{RF_l^k \to RF_{l+1}^n}, W_K^{RF_l^k \to RF_{l+1}^n}.$$

The equations are defined for a single attention head, but better accuracy could be achieved by using a multi-headed approach, that is a straightforward expansion of the single-headed mechanism.

Update Scheduling

In one example, a scheduling may be used for the general state updates for the RF and structural node states, in the sense that the state update of the nodes may happen sequentially by the components of the general state update equations. One instantiation of the sequential update scheme may be formalized as follows:

$$h_i^{S_l} = W_V^{S_l \to S_{l+1}} h_i^{S_l} + \sum_{v_j^{S_{l+1}} \in N_{v_i}^{S_l \to S_{l+1}}} \alpha_{ij}^{S_l \to S_{l+1}} W_V^{S_l \to S_{l+1}} h_j^{S_{l+1}},$$

$$\underbrace{\phantom{XXXXXXXXXXXXXXXXXXXXXXXXX}}_{\text{layer wise structure}}$$

$$h_i^{S_l} = W_V^{S_l \to S_l} h_i^{S_l} + \sum_{v_j^{S_l} \in N_{v_i}^{S_l \to S_l}} \alpha_{ij}^{S_l \to S_l} W_V^{S_l \to S_l} h_j^{S_l},$$

$$\underbrace{\phantom{XXXXXXXXXXXXXXXXXXXXXXXXX}}_{\text{structure–structure}}$$

$$h_i^{S_l} = W_V^{S_l \to S_l} h_i^{S_l} + \sum_{k=1}^{K} \sum_{v_j^{S_l} \in N_{v_i}^{S_l \to RF_l^k}} \alpha_{ij}^{S_l \to RF_l^k} W_V^{S_l \to RF_l^k} h_j^{RF_l^k}.$$

$$\underbrace{\phantom{XXXXXXXXXXXXXXXXXXXXXXXXX}}_{\text{structure–RF}}$$

The above 3 equations are 3 iterations, meaning, that the weight matrices are different in every iteration. Before stepping to the following layer, several iterations might be performed for the state update of the structure or RF nodes.

The information sharing between the different modalities can happen in a sequential way. However, further combinations may also be feasible. A scheduling mechanism could also be applied for the RF nodes.

Adding Distance Information to the Attention Mechanism

Since the 3D position of the nodes is known, the signed relative distance between the nodes may be computed and attached to the edges connecting the nodes.

The relative distance embedding is defined by the distance $\rho_{i,j} = \|x_i^{S_l} - x_j^{S_l}\|_2$ between the coordinates $x_i^{S_l}$, $x_j^{S_l}$ by applying sinusoidal encoding. By using sinusoidal encoding, high, frequency changes can be better represented for the network. The sinusoidal encoding function $p: \mathbb{N} \to \mathbb{R}^D$ of distance $\rho_{i,j}$ for the relative distance embedding $r_{i,j} \in \mathbb{R}^D$ is defined as follows:

$$r_{i,j} = p(\rho_{i,j}) = \begin{cases} r_{i,j,2k} = \sin\left(\frac{\rho_{i,j}}{n^{\frac{2k}{D}}}\right) \\ r_{i,j,2k+1} = \cos\left(\frac{\rho_{i,j}}{n^{2\frac{k}{D}}}\right) \end{cases},$$

where n is a user-defined scalar. The relative distance may be defined using the method described in Zheng Qin, Hao Yu, Changjian Wang, Yulan Guo, Yuxing Peng, Kai Xu. *Geometric Transformer for Fast and Robust Point Cloud Registration, In IEEE/CVF Conference on Computer Vision and Pattern Recognition* 2022.

In one example, the key values might be extended with the relative distance embedding as follows:

$$\alpha_{ij}^{A \to B} = \frac{\exp(\overbrace{((W_Q^{A \to B} h_i^A))^T}^{q_i^{A \to B}} \overbrace{(W_K^{A \to B} h_j^B + W_D^{A \to B} r_{ij})}^{k_j^{A \to B}})}{\sum_{v_k^B \in N_{v_i}^{A \to B}} \exp((W_Q^{A \to B} h_i^A)^T (W_K^{A \to B} h_k^B(v_k^B) + W_D^{A \to B} r_{ik}))}$$

where $W_D^{A \to B}$ is the distance weight matrix whose parameters are optimized during training.

Adding AP Distance and Orientation Information to the Attention Mechanism

In the case when the pose of the APs is registered in the 3D structural map of the space, a new RF embedding term could be defined by the distance (relative position) encoding $r_{i,AP}^d$, the angular distance (relative orientation) encoding $r_{i,AP}^{o}$ of the measurement orientation and the APs orientations. The RF embedding term $rf_{i,j}$ can be computed as follows: $rf_{ij} = W_D(r_{i,AP}^{d} + r_{j,AP}^{d}) + W_O(r_{i,AP}^{o} + r_{j,AP}^{o})$ where matrices $W_D$, $W_O$ transform the distance and orientation terms to the output dimensions. The sinusoidal encoding of the distance between the i-th RF node $x_i^{RF_i^k}$ and the position of the k-th corresponding AP $x_k^{AP}$ is defined as $$r_{i,AP}^{d} = p\left(\left\|x_i^{RF_i^k} - x_k^{AP}\right\|_2\right).$$

The sinusoidal encoding of the relative orientation between the i-th RF node $$x_i^{RF_i^k}$$

and the k-th AP is encoded as follows $$r_{i,AP}^{o} = \sum_{c=1}^{3} p\left(R\{q_i^{RF_i^k}\}_c \cdot R\{q_k^{AP}\}_c^T\right),$$

where $R\{q\} \in SO(3)$ denotes the rotational matrix equivalent of the rotational quaternion q and subscript c denotes the c-th column of the rotational matrix. This embedding term could be added to the key component in the attention mechanism, where applicable.

Output Decoder (504)

The output decoder 504 collects information from different modality graph nodes and creates the representations required to the output tasks. To achieve that, as shown in FIG. 5 the desired output coordinates 540.1 are transformed (540.2) into the output graph. The nodes are initialized (540.3) with the 3D position information and the signed relative distance is added to the edges of the graph. Before starting the fusion process (540.4), the 3D position information or its sinusoidal encoding is fed into a feed-forward neural network to create a higher dimensional representation of the positional information.

In the training or inference phase, the randomly selected measurement points will define the output graph.

Multi-Level Graph Fusion

To start a fusion process (540.4), the edges between the output nodes and the structure and RF nodes of different layers may be defined. For example, every output node is connected to every RF and structure node, and the information is collected from every layer of the global model. In this case the general state update equation for the output node is defined as $$h_i^O = W_V^O h_i^O + \sum_{l=1}^{L} \sum_{\substack{S_l \\ v_j^{S_l} \in N_{v_i}^{O \rightarrow S_l}}} \alpha_{ij}^{O \rightarrow S_l} W_V^{O \rightarrow S_l} h_j^{S_l}\left(v_j^{S_l}\right) +$$

$$\sum_{l=1}^{L} \sum_{k=1}^{K} \sum_{\substack{RF_i^k \\ v_j^{RF_i^k} \in N_{v_i}^{O \rightarrow RF_i^k}}} \alpha_{ij}^{O \rightarrow RF_i^k} h_j^{RF_i^k}\left(v_j^{RF_i^k}\right)$$

where the attention weights are calculated as defined previously in the general template formula, and the weight matrices $$W_{K,V,Q}^{O}, W_{K,V,Q}^{O \rightarrow S_l}, W_{K,V,Q}^{O \rightarrow RF_i^k}$$

are learnt during the training.

Scheduling strategies could also be applied for the output state update, as discussed above. Furthermore, the state update equation defines one update iteration, however, several iterations might be performed to create the final node state vectors. For every iteration new learnable weight matrices might be defined.

Output Types (540.5-6)

When computing the final output values, the output nodes states are given as inputs to three different multi-layer feed-forward networks, called output heads, to produce the required output. Neural network $\phi_1$ is responsible to predict (540.5) the RSS/PL values, $\phi_2$ is responsible to predict (540.6) the probability distribution over all empirical models and $\phi_3$ is responsible to predict the parameters of the empirical models. Different embodiments could implement different subsets of these neural networks.

For example, the two large scale path loss models may be used: (i.) the close-in (CI) free space reference distance PL model and (ii.) the close-in free space reference distance model with frequency-dependent path loss exponent (CIF). The CI model is defined as:

$$PL^{CI}(f, d) \text{ [dB]} = FSPL(f, 1m) + 10n \log_{10}\left(\frac{d}{d_0}\right) + X_\sigma^{CI}$$

where f is the frequency in Hz, n is the path loss exponent (PLE), d is the distance in meters, $X_\sigma^{CI}$ is the shadow fading term in dB, and the free space path loss (FSPL) at 1 m, and frequency f is given as:

$$FSPL(f, 1m) = 20 \log_{10}\left(\frac{4\pi f}{c}\right)$$

where c is the speed of light. The CIF model is defined as:

$$PL^{CIF}(f, d) = FSPL(f, 1m) + 10n\left(1 + b\left(\frac{f - f_0}{f_0}\right)\right) \log_{10}\left(\frac{d}{1m}\right) + X_\sigma^{CIF}$$

where n denotes the PLE, and b is an optimization parameter that captures the slope, or linear frequency dependency of the path loss exponent that balances at the centroid of the frequencies being modeled. The term $f_0$ is a fixed reference frequency, the centroid of all frequencies represented by the path loss model, found as the weighed sum of measurements from different frequencies.

In this example, network $\phi_2$ may have a two-dimensional output, containing the probability values assigned to the CI and CIF models. These values may be sum up to one. During training for this head, classification loss functions are used like: softmax cross-entropy loss, Kullback-Leibler divergence, etc. Network head $\phi_3$ may predict parameters n and $\sigma$ for the CI models and parameters n, b and $\sigma$ for the CIF model. Typically, regression-based loss functions may be used to train these parameters: like mean-squared error, Huber loss, mean absolute error, etc. Network head $\phi_1$ may predict the PL (in case the position and transmitter power is available) or RSS. Regression based loss functions may be used for that. It is also possible to connect the outputs of network head $\phi_2$ with the outputs of $\phi_1$. For example, a loss function could be defined between the mean of the empirical model with the predicted parameters from model $\phi_2$ and the regressed PL values from network head $\phi_1$ as follows:

$$L_{CI}=\|\phi_1(x)-PL^{CI}(f,\|x-x_{AP}\|^k\|; \phi_2 \to n_{CI})\|^2$$

$$L_{CIF}=\|\phi_1(x)-PL^{CIF}f,\|x-x_{AP}\|^k\|; \phi_2 \to n_{CIF}, b_{CIF})\|^2.$$

It is to be noted that this is just an example; further empirical models could be selected. This model also could have only a subset of the presented output heads.

The layered model 500 may, for example, be trained (and inferred) as follows.

Data Collection

The present method of FIG. 5 may require training data in the form of a geometric model of the space and sparse radio signal strength measurements within the space. Specifically, one may capture the environment geometry in form of a point cloud and record the RSS values of different APs together with precise 3D position labels. The most ubiquitous sensor setup may be composed of cameras, an inertial measurement unit (IMU) and an antenna together with a signal processing unit capable of capturing WiFi, Bluetooth, or cellular radio signals. While a custom capture sensor rig may be easily assembled by rigidly attaching a camera, a laptop, and a radio dongle, all these sensors may also be present in modern smartphone devices. A Lidar sensor may also capture the structure of the environment.

To create an accurate environment model and pose estimates for the sensors, good extrinsic calibration between the different sensors may be used. Furthermore, the different sensors may have a synchronized timing system.

Given a sequence of camera images and (optionally) IMU measurements, one may find the poses of the recording device together with the 3D structure of the environment. Different representations may be derived such as: meshes, geometric primitives, CAD models, point clouds, etc. . . . For example, models that have as input the environment structure may be created as point clouds. The point clouds may be created by means of sampling from higher-level representations such as meshes or parametric CAD models.

An example mathematical framework for creating a 3D reconstruction of the environment while determining the 6-DoF track of a camera are the Simultaneous Localization and Mapping (SLAM) algorithms. If the IMU sensor is also available, Visual-Inertial SLAM algorithms may further improve the mapping and pose estimation accuracy. The result of a SLAM algorithm may be a dense point cloud representing the environment structure and a pose for every image and/or IMU measurement. The radio signal strength may continuously be measured and saved while the sensor rig is moved in the space of the environment. As a last step, the pose may be defined for the RSS measurements. As the timestamp of the RSS measurement may not match the image timestamps, the pose of the RSS measurements may be interpolated based on the temporally closest image positions. This may give accurate 6-DoF pose to the PL/RSS measurements without any extra effort. The timestamp sources of the different modality measurements may be synchronized.

Training and Inference

Two different training modes may be distinguished depending on the availability of the training data. In the case of site-specific training, the training may be performed based on a single environment. In another case, the training may be performed based on a collection of environments. The present models may have 3 distinct types of outputs: (i.) RSS/PL predicted values, (ii.) empirical model selection from a previously defined empirical model list, (iii.) parameter predictions of the empirical models. In the following, ground truth data may be provided based on the measurements.

The proposed model may be trained via backpropagation because all the equations in all the building blocks may be differentiable. The deep learning model takes as input a structure map containing a 3D point cloud describing the structure of the environment, and a sparse 3D radio signal strength map. The sparse radio measurements are registered with the environment model and are separately handled for the APs in the environment. If available, the APs may also be added to the sparse RF together with their transmitter power.

The point cloud and the RF measurements are encoded in the neural network through a series of layers: local encoder layer, global encoder layer implemented as graph neural networks, and the output decoder that implements the fusion of the modalities and decodes graph representations to output predictions for the given query coordinates.

Ground Truth Generation

In one example, the RSS/PL ground truth is defined by selecting randomly a subset of the collected RF measurements together with their registered pose information for every training iteration. The selected measurements are not given as inputs for the network, but they serve as ground truth radio signal strength values for the respective locations, and the network must predict the RSS/PL values for these locations. The goal of the training process is to minimize the difference between the predicted and the measured signal strength at these locations. In the present case, the coordinates of the selected RF measurements and the desired RSS values are the inputs for the output decoder block in the training phase, as shown in FIG. 5.

Empirical model selection is the other potential output of the network. In this case, for preparing the ground truth values, several different solutions could be used to define the ground truth distributions. The motivation behind selecting the best empirical model, from a list of potential empirical models, is that every empirical model works well in a different environment and when interpolating it is difficult to estimate which model will perform well in a certain region. By building on the generalization capabilities of the deep learning models and by having as input the structure of the environment in the form of point clouds, one may expect to achieve better empirical model selection for regions where the number of measurements is limited or none. In one example, a user might select a region with several valid measurements and by using some non-linear model fitting algorithm the parameters of the empirical models are determined. Then the fitting error is determined for every empirical model in the same region. The error values are normalized, and a target distribution is created based on these values. The values of the target distribution may be sum up to one. In certain example, the user might create a target distribution where the best performing model (the model with the smallest fitting error) has the probability 1 and all the others are 0, or in a different embodiment the probabilities resulting from the SoftMax normalization function will serve as the ground truth values. After the target distribution is built a typical classification loss, such as the Cross-Entropy (CE) loss, could be used to train the network.

Finally, the parameters for the empirical model are determined for regions where non-linear model fitting can be applied. After optional normalization steps, the deep learning model may regress these parameters in regions where the ground truth parameters are available. Typically, mean squared error or Huber-loss is applied for regression problems.

At test time, the model predicts for every region the best RSS/PL value and/or will select the most appropriate empirical model together with its parameters.

Depending on the available training data, two training strategies could be elaborated: the site-specific training and the more general model.

Site-Specific Training

In the site-specific case, the training data is captured in a given environment, such as a warehouse, office, shopping mall, etc. The goal is to build a model that can generalize well in that specific environment. Generalize here means that one may predict in places where no measurements have been performed before. In this case the structure and the RF measurements may not change during the training and inference.

General Model Training

If a more general model is desired that can generalize to unseen environments, the weights and biases of the model are adjusted for a higher number of environments. In this case the batch for one training iteration contains point clouds and instead of RF measurements the transmitter power of the APs at their corresponding location may be provided. The goal is to predict the recorded RF measurements. So instead of predicting a subset of the RF measurements one may predict all the measurements only based on the transmitter power of the APS. Having a larger dataset with several different environments will create more general models, in the sense that these models will have a better estimation accuracy for unseen environments. It may be hypothesized that once the structure information is given for an unseen target environment, such a generally trained model may be able to predict meaningful RSS values even without RF measurements in the target environment.

The multi-layer architecture may thus enable a data-driven, hybrid, fine-grained RF signal strength prediction model. The present method can learn to predict the PL/RSS values for any output 3D coordinate, it can learn to select the most appropriate empirical model from a list of pre-defined models for the region around the 3D coordinate, and it can learn to estimate the model's parameters. The presented model depending on the training strategy could be used to interpolate PL/RSS measurements, or to aid the positioning of the APs in cluttered environments where typical line-of-site PL/RSS models fail to perform well.

Figure 6:
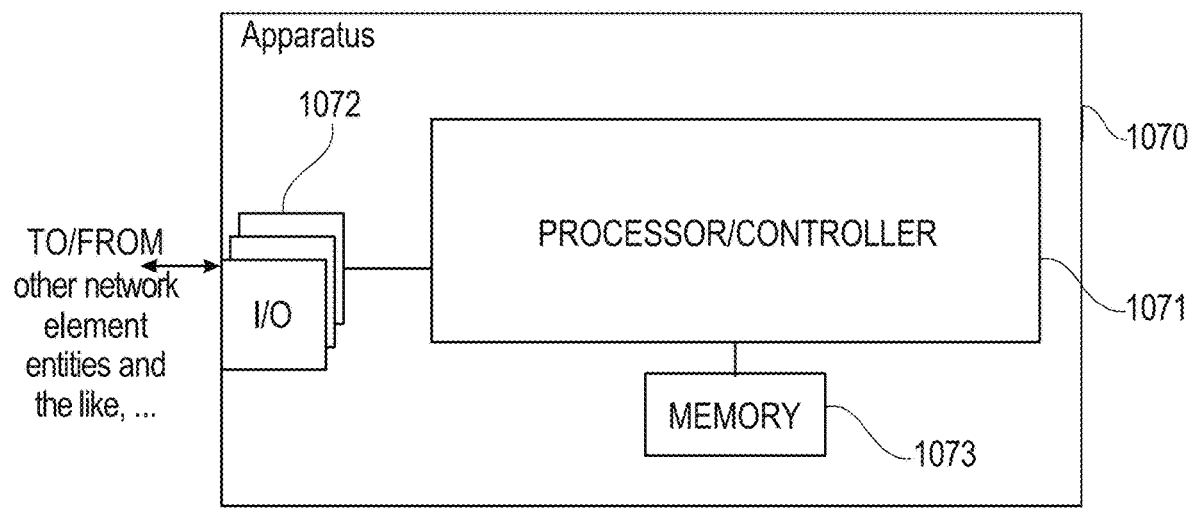
FIG. 6 is a block diagram showing an example of an apparatus according to an example of the present subject matter.

In FIG. 6, a block circuit diagram illustrating a configuration of an apparatus 1070 is shown, which is configured to implement at least part of the present subject matter. It is to be noted that the apparatus 1070 shown in FIG. 6 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform the method as described in connection with FIG. 3 or 4.

For example, the processor 1071 is configured for: receiving a first structure map comprising spatial points representing a structure of an environment and feature vectors descriptive of the points; receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements; creating using a first structure edge connecting rule a first structure graph whose nodes represent the points of the first structure map, the nodes being associated with state vectors obtained using the feature vectors of the points of the first structure map; creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map; creating a first input graph from the first structure graph and the first RF graph by using a second edge connecting rule; updating state vectors of the nodes of the first input graph, the updating of the state vector being performed using state vectors of intra-graph neighborhood nodes of the respective node and inter-graph neighborhood nodes of the node; creating an output graph whose nodes represent target spatial points of the environment, the nodes of the output graph being associated with state vectors; connecting the output graph with at least the first input graph using an output edge connecting rule, wherein the first input graph comprises the nodes with the updated state vectors; updating the state vectors of the output graph, the updating of the state vector being performed using state vectors of intra-graph neighborhood nodes of the respective node and inter-graph neighborhood nodes of the node; inputting the state vectors of the output graph to a trained machine learning model to obtain a prediction of a signal propagation characteristic at the target points.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus comprising: at least one processor; and at least one memory storing instructions that, when executed by the at least one processor, cause the apparatus at least to perform:
    receiving a first structure map comprising spatial points representing a structure of an environment and feature vectors descriptive of the points;
    receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements;
    creating using a first structure edge connecting rule a first structure graph, whose nodes represent the points of the first structure map, the nodes being associated with state vectors obtained using the feature vectors of the points of the first structure map;
    creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map;
    creating a first input graph from the first structure graph and the first RF graph by using a second edge connecting rule;
    updating state vectors of the nodes of the first input graph, the updating of the state vector being performed using state vectors of intra-graph neighborhood nodes of the respective node and inter-graph neighborhood nodes of the node;
    creating an output graph whose nodes represent target spatial points of the environment, the nodes of the output graph being associated with state vectors;
    connecting the output graph with at least the first input graph using an output edge connecting rule, wherein the first input graph comprises the nodes with the updated state vectors;
    updating the state vectors of the output graph, the updating of the state vector being performed using state vectors of intra-graph neighborhood nodes of the respective node and inter-graph neighborhood nodes of the node;
    inputting the state vectors of the output graph to a trained machine learning model to obtain a prediction of a signal propagation characteristic at the target points.

2. The apparatus of claim 1, wherein the instructions, when executed by the at least one processor, further cause the apparatus at least to perform:
    receiving an acquired initial structure map comprising initial spatial points representing the structure of the environment and initial feature vectors descriptive of the initial points;
    receiving at least one acquired initial RF map, the initial RF map comprising initial points representing locations of the environment where measurements of RF signals from a respective RF signal source are performed, the initial RF map further comprising initial feature vectors descriptive of the RF measurements;
    determining a first set of structure feature centers representing the initial points of the initial structure map;
    determining a first set of RF feature centers representing the initial points of the initial RF map;

clustering the initial points of the initial structure map around the first set of structure feature centers, thereby obtaining a first set of structure clusters;

clustering the initial points of the initial RF map around the first set of RF feature centers of the initial RF map, thereby obtaining a first set of RF clusters;

performing a combination of the initial feature vectors of the first set of structure clusters to obtain a first set of structure convolutional feature vectors representing the first set of structure feature centers;

performing a combination of the initial feature vectors of the first set of RF clusters to obtain a first set of RF convolutional feature vectors representing the first set of RF feature centers;

providing the points of the first structure map as the first set of structure feature centers, and the feature vectors of the first structure map as the first set of structure convolutional feature vectors;

providing the points of the first RF map as the first set of RF feature centers, and the feature vectors of the first RF map as the first set of RF convolutional feature vectors.

3. The apparatus of claim 2, wherein the instructions, when executed by the at least one processor, further cause the apparatus at least to perform:

determining the structure feature center by at least: combining the points that represent a respective area of the environment to obtain the structure feature center; and determining the RF feature center by at least: combining the points that represent a respective area of the environment to obtain the RF feature center.

4. The apparatus of claim 2, wherein the acquired initial structure map being a three-dimensional, 3D, point cloud.

5. The apparatus of claim 2, the combination of feature vectors being performed by a trained first encoder, herein referred to as first local encoder, the first local encoder being configured to process each cluster of points of the clusters and to output a convolutional feature vector.

6. The apparatus of claim 2, wherein the state vector is updated using a first encoder, referred to as first global encoder, the first global encoder is configured to receive as input the state vector of the specific node and the state vectors of the intra-graph and inter-graph neighborhood nodes of the specific node, and to provide the updated state vector of the specific node.

7. The apparatus of claim 6, wherein the first global encoder is a trained graph neural network updating state vectors of the first input graph.

8. The apparatus of claim 6, wherein the trained machine learning model being a decoder, wherein the first local encoder, the first global encoder and the decoder are jointly trained to determine their learnable parameters such that a deviation between the predicted signal propagation characteristics and known signal propagation characteristics is optimized.

9. The apparatus of claim 2, wherein the instructions, when executed by the at least one processor, further cause the apparatus at least to perform:

determining a second set of structure feature centers representing the points of the first structure map;

determining a second set of RF feature centers representing the points of the first RF map;

clustering the points of the first structure map around the second set of structure feature centers, thereby obtaining a second set of structure clusters;

clustering the points of the first RF map around the second set of RF feature centers of the first RF map, thereby obtaining a second set of RF clusters;

performing a combination of the feature vectors of the second set of structure clusters to obtain a second set of structure convolutional feature vectors representing the second set of structure feature centers;

performing a combination of the feature vectors of the second set of RF clusters to obtain a second set of RF convolutional feature vectors representing the second set of RF feature centers;

providing the points of a second structure map as the second set of structure feature centers, and the feature vectors of the second structure map as the second set of structure convolutional feature vectors;

providing the points of a second RF map as the second set of RF feature centers, and the feature vectors of the second RF map as the second set of RF convolutional feature vectors.

10. The apparatus of claim 9, wherein the instructions, when executed by the at least one processor, further cause the apparatus at least to perform:

creating using a second structure edge connecting rule a second structure graph whose nodes represent the points of the second structure map, the nodes being associated with state vectors obtained using the feature vectors of the points of the second structure map;

creating using a second RF edge connecting rule a second RF graph, the second RF graph having nodes representing the points of the second RF map, wherein the nodes of the second RF graph are associated with state vectors obtained using the feature vectors of the second RF map;

creating a second input graph from the second structure graph and the second RF graph by using the second edge connecting rule;

updating state vectors of the nodes of the second input graph, the updating of the state vector being performed using state vectors of intra-graph neighborhood nodes of the respective node and inter-graph neighborhood nodes of the node;

wherein nodes of the output graph are connected further using the second input graph, wherein the second structure map comprises a number of points smaller than or equal to the number of points of the first structure map, wherein the number of points of the second RF map is smaller than or equal to the number of points of the first RF map.

11. The apparatus of claim 10, wherein the inter-graph neighborhood nodes of the node of the first structure graph comprise nodes of at least one of: the first RF graph, the second structure graph or the second RF graph;

wherein the inter-graph neighborhood nodes of the node of the first RF graph comprise nodes of at least one of: the first RF graph different from the specific first RF graph, the second structure graph, the second RF graph, or the first structure graph.

12. The apparatus of claim 10, wherein the state vector of a specific node is updated using a second encoder, referred to as second global encoder, the second global encoder is configured to receive as input the state vector of the specific node and the state vectors of the neighborhood nodes of the specific node, and to predict the state vector of the specific node.

13. The apparatus of claim 1, wherein a first edge connecting rule is the first RF edge connecting rule or the first structure edge connecting rule, the first edge connecting rule being the output edge connecting rule or being different from the output edge connecting rule, the first edge connecting rule being the second edge connecting rule or being different from the second edge connecting rule.

14. A method comprising:
receiving a first structure map comprising spatial points representing a structure of an environment and feature vectors descriptive of the points;
receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements;
creating using a first structure edge connecting rule a first structure graph whose nodes represent the points of the first structure map, the nodes being associated with state vectors obtained using the feature vectors of the points of the first structure map;
creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map;
creating a first input graph from the first structure graph and the first RF graph by using a second edge connecting rule;
updating state vectors of the nodes of the first input graph, the updating of the state vector being performed using state vectors of intra-graph neighborhood nodes of the respective node and inter-graph neighborhood nodes of the node;
creating an output graph whose nodes represent target spatial points of the environment, the nodes of the output graph being associated with state vectors;
connecting the output graph with at least the first input graph using an output edge connecting rule, wherein the first input graph comprises the nodes with the updated state vectors;
updating the state vectors of the output graph, the updating of the state vector being performed using state vectors of intra-graph neighborhood nodes of the respective node and inter-graph neighborhood nodes of the node;
inputting the state vectors of the output graph to a trained machine learning model to obtain a prediction of a signal propagation characteristic at the target points.

15. The method of claim 14, further comprising:
receiving an acquired initial structure map comprising initial spatial points representing the structure of the environment and initial feature vectors descriptive of the initial points;
receiving at least one acquired initial RF map, the initial RF map comprising initial points representing locations of the environment where measurements of RF signals from a respective RF signal source are performed, the initial RF map further comprising initial feature vectors descriptive of the RF measurements;
determining a first set of structure feature centers representing the initial points of the initial structure map;
determining a first set of RF feature centers representing the initial points of the initial RF map;
clustering the initial points of the initial structure map around the first set of structure feature centers, thereby obtaining a first set of structure clusters;
clustering the initial points of the initial RF map around the first set of RF feature centers of the initial RF map, thereby obtaining a first set of RF clusters;
performing a combination of the initial feature vectors of the first set of structure clusters to obtain a first set of structure convolutional feature vectors representing the first set of structure feature centers;
performing a combination of the initial feature vectors of the first set of RF clusters to obtain a first set of RF convolutional feature vectors representing the first set of RF feature centers;
providing the points of the first structure map as the first set of structure feature centers, and the feature vectors of the first structure map as the first set of structure convolutional feature vectors;
providing the points of the first RF map as the first set of RF feature centers, and the feature vectors of the first RF map as the first set of RF convolutional feature vectors.

16. The method of claim 15, further comprising:
determining the structure feature center by at least: combining the points that represent a respective area of the environment to obtain the structure feature center; and
determining the RF feature center by at least: combining the points that represent a respective area of the environment to obtain the RF feature center.

17. The method of claim 16, further comprising:
determining a second set of structure feature centers representing the points of the first structure map;
determining a second set of RF feature centers representing the points of the first RF map;
clustering the points of the first structure map around the second set of structure feature centers, thereby obtaining a second set of structure clusters;
clustering the points of the first RF map around the second set of RF feature centers of the first RF map, thereby obtaining a second set of RF clusters;
performing a combination of the feature vectors of the second set of structure clusters to obtain a second set of structure convolutional feature vectors representing the second set of structure feature centers;
performing a combination of the feature vectors of the second set of RF clusters to obtain a second set of RF convolutional feature vectors representing the second set of RF feature centers;
providing the points of a second structure map as the second set of structure feature centers, and the feature vectors of the second structure map as the second set of structure convolutional feature vectors;
providing the points of a second RF map as the second set of RF feature centers, and the feature vectors of the second RF map as the second set of RF convolutional feature vectors.

18. The method of claim 17, further comprising:
creating using a second structure edge connecting rule a second structure graph whose nodes represent the points of the second structure map, the nodes being associated with state vectors obtained using the feature vectors of the points of the second structure map;
creating using a second RF edge connecting rule a second RF graph, the second RF graph having nodes representing the points of the second RF map, wherein the nodes of the second RF graph are associated with state vectors obtained using the feature vectors of the second RF map;

creating a second input graph from the second structure graph and the second RF graph by using the second edge connecting rule;

updating state vectors of the nodes of the second input graph, the updating of the state vector being performed using state vectors of intra-graph neighborhood nodes of the respective node and inter-graph neighborhood nodes of the node;

wherein the output graph is connected further using the second input graph, wherein the second structure map comprises a number of points smaller than or equal to the number of points of the first structure map, wherein the number of points of the second RF map is smaller than or equal to the number of points of the first RF map.

19. The method of claim 18, wherein the inter-graph neighborhood nodes of the node of the first structure graph comprise nodes of at least one of: the first RF graph, the second structure graph or the second RF graph;

wherein the inter-graph neighborhood nodes of the node of the first RF graph comprise nodes of at least one of: the first RF graph different from the specific first RF graph, the second structure graph, the second RF graph, or the first structure graph.

20. A non-transitory computer readable medium comprising program instructions that, when executed by an apparatus, cause the apparatus to perform at least the following:

receiving a first structure map comprising spatial points representing a structure of an environment and feature vectors descriptive of the points;

receiving at least a first radio frequency, RF, map for respective at least one RF signal source, the first RF map comprising spatial points representing locations of the environment where measurements of RF signals from a respective RF signal source are performed, the first RF map further comprising feature vectors descriptive of the RF measurements;

creating using a first structure edge connecting rule a first structure graph whose nodes represent the points of the first structure map, the nodes being associated with state vectors obtained using the feature vectors of the points of the first structure map;

creating using a first RF edge connecting rule, for the first RF map, a first RF graph, the first RF graph having nodes representing the points of the respective first RF map, wherein the nodes of the first RF graph are associated with state vectors obtained using the feature vectors of the first RF map;

creating a first input graph from the first structure graph and the first RF graph by using a second edge connecting rule;

updating state vectors of the nodes of the first input graph, the updating of the state vector being performed using state vectors of intra-graph neighborhood nodes of the respective node and inter-graph neighborhood nodes of the node;

creating an output graph whose nodes represent target spatial points of the environment, the nodes of the output graph being associated with state vectors;

connecting the output graph with at least the first input graph using an output edge connecting rule, wherein the first input graph comprises the nodes with the updated state vectors;

updating the state vectors of the output graph, the updating of the state vector being performed using state vectors of intra-graph neighborhood nodes of the respective node and inter-graph neighborhood nodes of the node;

inputting the state vectors of the output graph to a trained machine learning model to obtain a prediction of a signal propagation characteristic at the target points.

* * * * *